US012164692B2

(12) United States Patent
Mani et al.

(10) Patent No.: US 12,164,692 B2
(45) Date of Patent: Dec. 10, 2024

(54) ASSISTIVE DEVICE FOR NON-VISUALLY DISCERNING A THREE-DIMENSIONAL (3D) REAL-WORLD AREA SURROUNDING A USER

(71) Applicants: Niki Mani, La Jolla, CA (US); Alex Hamid Mani, LaJolla, CA (US); Ahmadreza Rofougaran, Newport Beach, CA (US)

(72) Inventors: Niki Mani, La Jolla, CA (US); Alex Hamid Mani, LaJolla, CA (US); Ahmadreza Rofougaran, Newport Beach, CA (US)

( * ) Notice: Subject to any disclaimer, the term of this patent is extended or adjusted under 35 U.S.C. 154(b) by 0 days.

(21) Appl. No.: 18/334,519

(22) Filed: Jun. 14, 2023

(65) Prior Publication Data
US 2023/0341943 A1    Oct. 26, 2023

Related U.S. Application Data

(63) Continuation of application No. 17/496,682, filed on Oct. 7, 2021, now Pat. No. 11,726,571, which is a
(Continued)

(51) Int. Cl.
*G06F 3/01* (2006.01)
*G06F 3/0346* (2013.01)
(Continued)

(52) U.S. Cl.
CPC .............. *G06F 3/016* (2013.01); *G06F 3/011* (2013.01); *G06F 3/017* (2013.01); *G06F 3/0346* (2013.01); *G06F 3/0416* (2013.01); *G08B 6/00* (2013.01)

(58) Field of Classification Search
None
See application file for complete search history.

(56) References Cited

U.S. PATENT DOCUMENTS 8,410,916 B1 * 4/2013 Camoriano Gladson ................... G06F 3/016
340/407.1
9,635,440 B2    4/2017 Lacroix
(Continued)

OTHER PUBLICATIONS

Final Office Action for U.S. Appl. No. 17/037,408 dated Jul. 18, 2023.
(Continued)

*Primary Examiner* — Benjamin X Casarez
(74) *Attorney, Agent, or Firm* — CHIP Law Group

(57) ABSTRACT

An assistive device and method for non-visually discerning a three dimensional (3D) real-world area surrounding a user, includes a haptic feedback interface. The assistive device receives input to establish a mapping of a plurality of objects within a proximity range to at least one haptic element of the plurality of haptic elements in a defined region of the haptic feedback interface. Further, the assistive device merges two or more nearby relevant objects in the plurality of objects as one object so as to map the one relevant object to a corresponding haptic element of the set of haptic elements in the touch-discernible feedback. Furthermore, the assistive device adjusts sizes of the plurality of objects to map the plurality of objects with a set of haptic elements of the plurality of haptic elements while merging the two or more nearby relevant objects.

21 Claims, 9 Drawing Sheets

Related U.S. Application Data continuation-in-part of application No. 17/037,408, filed on Sep. 29, 2020, now Pat. No. 12,008,164, which is a continuation of application No. 16/526,061, filed on Jul. 30, 2019, now Pat. No. 10,831,311, which is a continuation of application No. 15/709,793, filed on Sep. 20, 2017, now Pat. No. 10,503,310.

(51) Int. Cl.
*G06F 3/041* (2006.01)
*G08B 6/00* (2006.01)

(56) References Cited

U.S. PATENT DOCUMENTS

| | | | |
|---|---|---|---|
| 10,281,943 | B1 | 5/2019 | Ho |
| 11,561,619 | B2 | 1/2023 | Mani et al. |
| 11,726,571 | B2 * | 8/2023 | Mani .................... G06F 3/0346 345/173 |
| 11,782,510 | B2 | 10/2023 | Mani et al. |
| 2013/0038756 | A1 | 2/2013 | Cheng |
| 2015/0253851 | A1 | 9/2015 | Oh et al. |
| 2016/0018920 | A1 | 1/2016 | Deokar et al. |
| 2016/0184703 | A1 | 6/2016 | Brav et al. |
| 2017/0024010 | A1 * | 1/2017 | Weinraub ............... G01C 21/20 |
| 2018/0112978 | A1 | 4/2018 | Burton et al. |
| 2018/0189567 | A1 | 7/2018 | Maheriya et al. |
| 2019/0276051 | A1 | 9/2019 | Marti et al. |

OTHER PUBLICATIONS

Notice of Allowance for U.S. Appl. No. 17/970,869 dated Jun. 16, 2023.

Notice of Allowance for U.S. Appl. No. 17/037,408 dated Oct. 12, 2023.

Non-Final Office Action for U.S. Appl. No. 18/469,933 dated Apr. 10, 2024.

Notice of Allowance for U.S. Appl. No. 18/481,013 dated Apr. 24, 2024.

Notice of Allowance for U.S. Appl. No. 18/469,933 dated Aug. 29, 2024.

* cited by examiner

ASSISTIVE DEVICE FOR NON-VISUALLY DISCERNING A THREE-DIMENSIONAL (3D) REAL-WORLD AREA SURROUNDING A USER

CROSS-REFERENCE TO RELATED APPLICATIONS/INCORPORATION BY REFERENCE

This patent application makes reference to, claims priority to, claims the benefit of, and is a Continuation application of U.S. patent application Ser. No. 17/496,682, filed on Oct. 7, 2021, which is a Continuation-in-part application of U.S. patent application Ser. No. 17/037,408, filed on Sep. 29, 2020, which is a Continuation application of U.S. Pat. No. 10,831,311, granted on Nov. 10, 2020, which is a Continuation application of U.S. Pat. No. 10,503,310, granted on Dec. 10, 2019.

FIELD

Various embodiments of the disclosure relate to assistive technologies. More specifically, various embodiments of the disclosure relate to an assistive device for non-visually discerning a three dimensional (3D) real-world area surrounding a user.

BACKGROUND

With the growth of human-machine interaction (HMI) and sensor technologies, various assistive devices have been developed. However, technological developments in HMI are primarily focused on vision-based interaction technology. Humans have five traditional recognized senses, sight (ophthalmoception), hearing (audioception), taste (gustaoception), smell (olfacoception or olfacception), and touch (tactioception). The loss of one or more senses generally results in enhancing one or more of the remaining senses to compensate for the lost sense(s). For people that have a loss of sight or impaired sight, existing technology are typically focused on Braille-based tactile presentation systems. A Braille character includes a fixed pattern, which is a three-row by two-column "6-dot Braille cell" or a four-row by two-column "8-dot Braille cell" with combinations of raised dots that represent letters of the alphabet, numbers, punctuation, and defined symbols. As existing technology are typically focused on Braille-based tactile presentations, HMI for people that have a loss of sight or impaired sight is usually limited to the use of 8-keys Braille input, on-screen readers, or other tactile forms that are of limited functionality and use. It is known that the sense of touch has a much greater sensory resolution than the sense of sight. Hence, the sense of touch can detect even small changes on a surface that the eye cannot detect. These powerful non-visual senses, such as the sense of touch or hearing, may potentially be harnessed to help people that have lost or impaired the sense of sight to better understand and navigate the world in an effective manner. These powerful non-visual senses may also be used in certain situations where human vision is of limited use, for example, in areas that are devoid or partially devoid of light. Thus, an advanced system may be required for non-visually discerning a three-dimensional (3D) real-world area surrounding a user.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

An assistive device and method for non-visually discerning a three dimensional (3D) real-world area surrounding a user substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
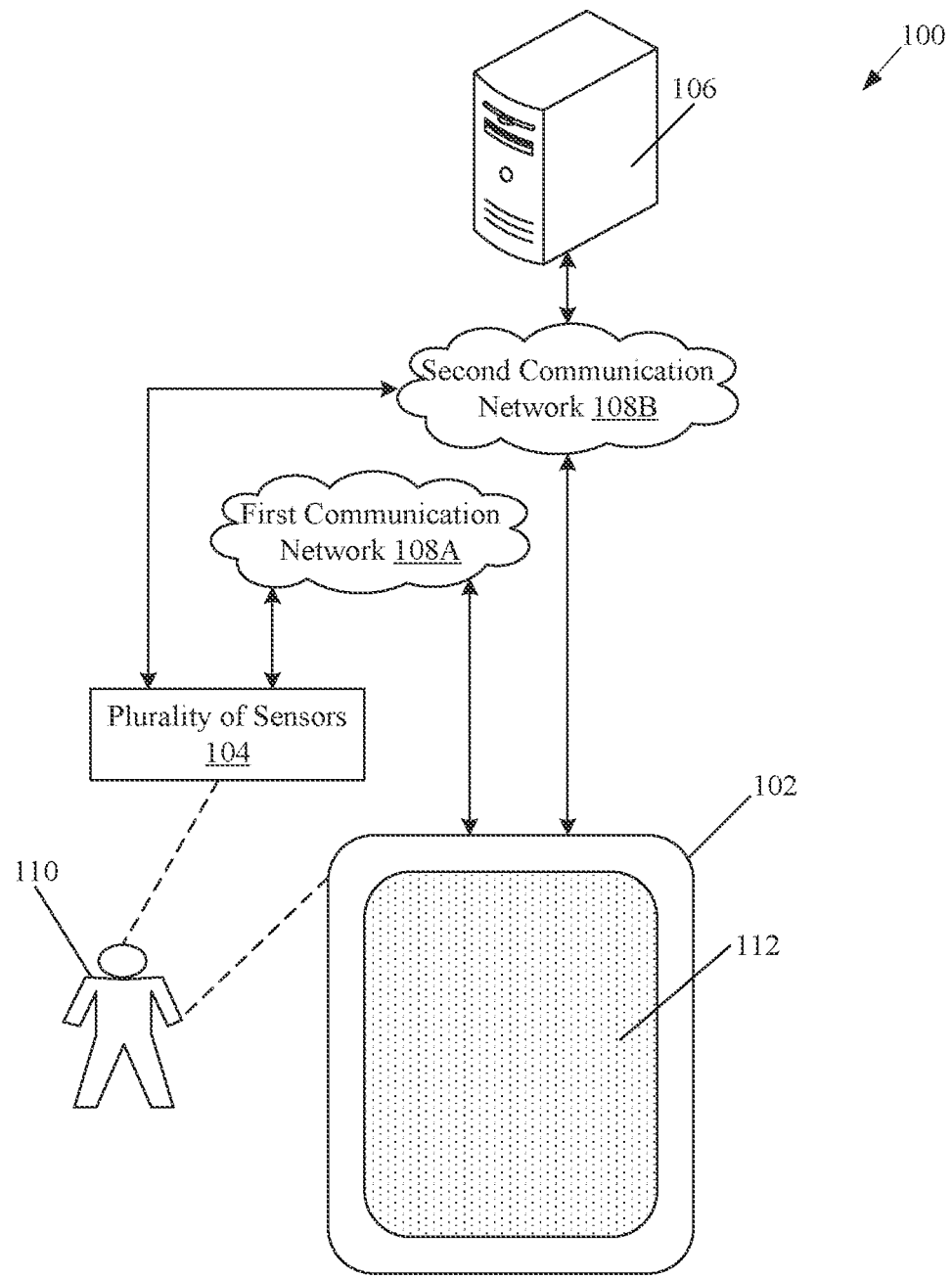
FIG. 1 illustrates an exemplary environment for non-visually discerning a three dimensional (3D) real-world area surrounding a user, in accordance with an embodiment of the disclosure.

The following described implementations may be found in the disclosed assistive device and method for non-visually discerning a 3D real-world area surrounding a user. Exemplary aspects of the disclosure may include an assistive device that may include a haptic feedback interface comprising a plurality of haptic elements. The assistive device may further comprise a first circuitry configured to receive sensor data of a three-dimensional (3D) real-world area within a first proximity range of the assistive device from a plurality of different types of sensors that are communicatively coupled to the assistive device, where the sensor data is associated with the first proximity range of the assistive device. The assistive device may further comprise a second circuitry configured to determine a plurality of objects within the first proximity range based on the received sensor data. The second circuitry may be further configured to receive an input to select a mode (e.g., a nature mode or a mobility mode) from a plurality of defined modes in the assistive device. Based on the selected mode, the second circuitry may be further configured to determine each of the plurality of objects as a relevant object or a non-relevant object to obtain a set of relevant objects and a set of non-relevant objects. The second circuitry may be further configured to determine a scaling factor based on the first proximity range and the selected mode. The second circuitry may be further configured to adjust sizes of the set of relevant objects to map the set of relevant objects with a set of haptic elements of the plurality of haptic elements of the haptic feedback interface, where the sizes of the set of relevant objects are adjusted based on the scaling factor and a count of the set of the relevant objects. The assistive device may further comprise a haptic feedback generator configured to generate a touch-discernible feedback on the haptic feedback interface based on the mapping of the set of relevant objects in the adjusted sizes with the set of haptic elements.

The disclosed assistive device is improved in terms of its functioning, for example, by further enhancing the capability to non-visually discern the 3D real-world area surrounding the user of the assistive device with improved accuracy and at the same time by reducing the feedback time to generate the touch-discernible feedback on the haptic feedback interface. The assistive device provides different modes when which used provides a capability to the assistive device to determine whether the plurality of objects determined using the sensor data are indeed relevant or non-relevant objects for the user. It is observed that given a purpose of use or the way the assistive device is used, for example, whether used to assist in mobility or just to experience what occurring in the surrounding, some objects may be more relevant while some objects may be comparatively less relevant or not relevant at all. As there may be hundreds of objects in the real-world surroundings of the user, processing all such surrounding objects may increase the processing load and drain battery during the operation of the assistive device, which is not desirable. Thus, the disclosed assistive device not only significantly reduces the battery consumption but also improves the generated touch-discernible feedback by increasing the accuracy in the determination of the scaling factor as the assistive device takes into account the selected mode along with the selected proximity range. Moreover, only the set of relevant objects may be considered for the adjustment of their object sizes and the generation of feedback layout, which reduces the processing load and reduces clutter in the layout of the generated touch-discernible feedback, thereby enhancing the capability to non-visually discern the 3D real-world area surrounding the user. The assistive device further considers the count of the set of the relevant objects in addition to the determined scaling factor to adjust the sizes of the set of relevant objects, which further improves the performance of the assistive device in terms of reducing the processing load, battery consumption, while improving the feedback time and ease of use. Thus, such powerful non-visual senses, such as the sense of touch, may be harnessed in an improved manner to help people that have lost or impaired the sense of sight to better understand and navigate the world in a more effective manner. These powerful non-visual senses may also be used effectively in certain situations where human vision is of limited use, for example, in areas that are devoid or partially devoid of light.

FIG. 1 illustrates an exemplary environment for non-visually discerning a three-dimensional (3D) real-world area surrounding a user, in accordance with an embodiment of the disclosure. With reference to FIG. 1, there is shown an exemplary environment 100. The exemplary environment 100 may include an assistive device 102, a plurality of sensors 104, a server 106, a first communication network 108A, a second communication network 108B, and one or more users, such as a user 110. The assistive device 102 may include a haptic feedback interface 112. The assistive device 102 may be communicatively coupled to the plurality of sensors 104 via the first communication network 108A or the second communication network 108B. The assistive device 102 may be communicatively coupled to the server 106 via the second communication network 108B.

The assistive device 102 may refer to a special-purpose device to provide assistance to a user, such as the user 110, of the assistive device 102 for non-visually discerning any 3D real-world area surrounding the user 110. The 3D real-world area surrounding the user 110 may be an indoor area or an outdoor area. The assistive device 102 may include suitable logic, circuitry, and/or code to generate a touch-discernible feedback on the haptic feedback interface 112. The touch-discernible feedback on the haptic feedback interface 112 may enable the user 110 to discern the 3D real-world area surrounding the user 110. In accordance with an embodiment, the touch-discernible feedback may be 3D touch-discernible feedback generated based on the sensor data of the 3D real-world area surrounding the user 110 received from the plurality of sensors 104.

In some embodiments, the assistive device 102 may be implemented as a hand-held portable device. In some embodiments, the assistive device 102 may be implemented as one or more wearable devices that may be worn around at different parts of the human body having sensory receptors that sense touch. It is known that the somatic sensory system of the human body is responsible for the sense of touch. The somatic sensory system has sensory touch or pressure receptors that enable a human to feel when something comes into contact with skin. The sense of touch may also be referred to as somatic senses or somesthetic senses that include proprioception (e.g., sense of position and movement) or haptic perception. Typically, such sensory receptors for sense of touch are present, for example, on the skin, epithelial tissues, muscles, bones, and joints, and even on certain internal organs of the human body. Examples of implementation of the assistive device 102 may include but are not limited to a special-purpose portable assistive device, special-purpose hand gloves, special-purpose shoes, or a wearable device that may be worn as a wrist band, wrapped around arms, or any part of the human body or as a shoe sole.

The plurality of sensors 104 may comprise suitable logic, circuitry, and/or interfaces that may be configured to detect one or more cues of the 3D real-world area surrounding the user 110 and generate a corresponding output, such as sensor data. The plurality of sensors 104 may include wearable sensors that may be worn by the user 110, sensors that may be integrated with the assistive device 102, or other personal devices, such as a smartphone, of the user 110. The plurality of sensors 104 refers to a plurality of different types of sensors. Examples of the plurality of sensors 104 may include, but are not limited to, a motion sensor (such as an accelerometer and a gyroscope), a location sensor (such as a global positioning system (GPS) sensor), a direction detecting sensor (such as a compass or magnetometer), an image-capture device (such as a stereoscopic camera, a 360-degree camera, a wide-angle camera, or other image sensors), an atmospheric pressure detection sensor (such as a barometer), a depth sensor, an altitude detection sensor (such as altimeter), a lux meter, a radio frequency (RF) sensor, an ultrasound sensor, or an object detection sensor (such as Radar, Light Detection and Ranging (LIDAR), and an infrared (IR) sensor). In an implementation, the plurality of sensors 104 may be provided in the assistive device 102.

The server 106 may comprise suitable logic, circuitry, interfaces, and/or code that may be configured to store satellite imagery, street maps, and 360-degree panoramic views of streets of various geographical areas. In some embodiments, the server 106 may be configured to communicate a first template digital map of the 3D real-world area for a location of the assistive device 102, based on a template map request for the location received from the assistive device 102. The first template digital map may be a digital map of the 3D real-world area for the location. In accordance with an embodiment, the server 106 may be configured to store historical usage pattern data of a plurality of different users, such as the user 110. Examples of the server 106 may include, but are not limited to, a cloud server, an application server, a database server, a web server, a file server, and/or their combination.

The first communication network 108A may be a medium that may enable communication between the assistive device 102 and the plurality of sensors 104. The first communication network 108A may be implemented by one or more wired or wireless communication technologies known in the art. The first communication network 108A may refer to a short-range or medium-range wireless communication network. Examples of wireless communication networks may include, but are not limited to, a Wireless-Fidelity (Wi-Fi) based network, a Light-Fidelity (Li-Fi) based network, a wireless personal area network (WPAN) such as a BLUETOOTH™ network, Internet-of-Things (IoT) network, Machine-Type-Communication (MTC) network, and/or a Wi-Max based network.

The second communication network 108B may be a medium that may facilitate communication between the assistive device 102 and the server 106. The second communication network 108B may be implemented by one or more wireless communication technologies known in the art. Examples of the wireless communication networks may include, but not limited to, the Internet, a cloud network, a wireless wide area network (WWAN), a Local Area Network (LAN), a plain old telephone service (POTS), a Metropolitan Area Network (MAN), or a cellular or mobile network, such as Global System for Mobile Communications (GSM), General Packet Radio Service (GPRS), Enhanced Data Rates for GSM Evolution (EDGE), 1G, 2G, 3G, 4G Long Term Evolution (LTE), 5G, IEEE 802.11, 802.16, and the like.

The haptic feedback interface 112 may comprise a plurality of haptic elements. In accordance with an embodiment, the haptic feedback interface 112 may refer to a haptic output interface configured to provide at least a touch-discernible output to the user 110. In some embodiments, the haptic feedback interface 112 may refer to a haptic input/output (I/O) interface configured to receive haptic input as well as provide haptic output to the user 110 from the same haptic I/O interface. It is known that the sense of touch has a much greater sensory resolution than the sense of sight. Hence, the sense of touch can detect even small changes on a surface that the eye cannot detect. This principle of the sense of touch may be used to guide the design of the haptic feedback interface 112.

In accordance with an embodiment, the user 110 may be a person who have lost sight or impaired the sense of sight. The user 110 may want to learn and understand about the surrounding world. It is known that sighted people visualize the surrounding world by detection of edges between areas of different wavelengths of light, which is then perceived as different colors by the brain. Based on feedback from the visual system, visual part of the brain referred to as visual cortex, processes visual information of the surrounding world to enable the sighted people to visualize the surrounding world. Information about the features on the surface of an object, like color and shading, provide certain clues about its identity. It is also known the loss of one or more senses, such as the sense of sight, generally results in enhancement of one or more of the remaining senses, such as sense of touch, hearing, smell, or taste, to compensate for the lost sense(s). The assistive device 102 harnesses the non-visual senses, such as the sense of touch, hearing, and/or smell, to assist users, such as the user 110, who have lost sight or impaired the sense of sight for enhanced and accurate understanding of the 3D real-world area surrounding the user 110. The assistive device 102 may also be used even by sighted people in certain situations where human vision is of limited use, for example, in areas that are devoid or partially devoid of light, for example, during night to augment the sense of sight using other human senses, such as audioception, olfacoception, and tactioception.

In operation, the assistive device 102 may be configured to receive sensor data of the 3D real-world area within the first proximity range of the assistive device 102 from a plurality of different types of sensors (such as the plurality of sensors 104) that are communicatively coupled to the assistive device 102. The plurality of different types of sensors, for example, may include the location sensor, the motion sensor, the image-capture device, the RF sensor, the ultrasound sensor, the IR sensor, or other types of object detection sensor (such as Radar or LIDAR). The image-capture device may refer to a stereoscopic camera, 360-degree camera, a night vision camera, a wide-angle camera, or other image sensors or their combination. Thus, in certain scenarios, where one type of sensor may not capture accurate information of the 3D real-world area within the first proximity range of the assistive device 102, other types of sensors may complement and capture information of the 3D real-world area. The sensor data may be associated with the first proximity range of the assistive device 102.

In accordance with an embodiment, the plurality of different types of sensors (such as the plurality of sensors 104) may include sensors, for example, rain sensors, altimeter, lux meter, barometer, and the like, that senses environmental conditions and/or characteristics, such as weather conditions or lighting conditions). Based on the environmental conditions and/or characteristics, information of the 3D real-world area acquired from a first group of sensors of the plurality of different types of sensors may be assigned a higher weight value (i.e., preferable) than information acquired from a second group of sensors of the plurality of different types of sensors. The classification of sensors in the first group of sensors and the second group of sensors may be done based on defined criteria and the sensed environmental conditions and/or characteristics. The defined criteria, for example, may be defined rules based on known accuracy of information detected in different environmental conditions from each sensor. For example, in certain weather conditions, the information, such as images captured from the image-capture device, may not be useful. In such cases, the sensor data from the RF sensor, LIDAR, ultrasound sensor may be provided a higher weight value as compared to the sensor data from the image-capture device.

The assistive device 102 may be configured to determine a plurality of objects within the first proximity range based on the received sensor data. The assistive device 102 may be configured to identify an object-type of each of the plurality of different objects present within the first proximity range of the assistive device 102 based on the received sensor data. For example, the assistive device 102 may be configured to identify whether an object is a building, a human, an animal, a road, a traffic light, a tree, a plant, a pedestrian crossing, a pedestrian path, such as a sidewalk path, moving objects, such as a two-wheeler, a three-wheeler, a four-wheeler, stairs, an obstacle, etc. The use of the plurality of sensors 104 results in faster and more accurate determination of the plurality of objects as compared to sensor data received exclusively from one type of sensor, such as the image-capture device or in different environmental or weather conditions, for example, rain, hailstorm, during the night, and the like. Although an approximate distance of different objects in an image frame may be estimated by image processing, the distance or position of objects calculated from the RF sensor or the LIDAR may be faster and more accurate as compared to the image-processing methods. This helps to generate a 3D haptic model of the 3D real-world area surrounding the user 110 quickly and accurately, based on the sensor data received from the plurality of different types of sensors (such as the plurality of sensors 104).

The assistive device 102 may be configured to receive an input to select a mode from a plurality of defined modes in the assistive device 102. The plurality of defined modes may comprise a nature mode and a mobility mode. The nature mode refers to a mode that provides the user 110 of the assistive device 102 with a capability to non-visually explore the surrounding nature in the selected proximity, such as the first proximity, using the assistive device 102. The mobility mode refers to a mode that provides the user 110 of the assistive device 102 with a capability to navigate in the selected proximity, such as the first proximity, using the assistive device 102. The assistive device 102 provides the plurality of defined modes which when used provides a capability to the assistive device 102 to determine whether the plurality of objects determined using the sensor data are indeed relevant or non-relevant objects for the user. Based on the selected mode, the assistive device 102 may be further configured to determine each of the plurality of objects as a relevant object or a non-relevant object to obtain a set of relevant objects and a set of non-relevant objects.

In accordance with an embodiment, the plurality of objects may be determined as the relevant object or the non-relevant object further based on the identified object-type of each of the plurality of objects and the selected mode. Moreover, the resolution of the 3D real-world area within the first proximity range may be higher when the selected mode is the nature mode as compared to the mobility mode. For example, the user 110 may be able to non-visually discern more objects present in the 3D real-world area within the first proximity range in the nature mode as compared to the mobility mode.

The assistive device 102 may be further configured to determine a scaling factor based on the first proximity range and the selected mode. The assistive device 102 may be configured to compute the scaling factor in accordance with the first proximity range, an area of the haptic feedback interface 112 on which a haptic feedback is to be generated, and additionally the selected mode. The assistive device 102 may be configured to generate a 3D model of the 3D real-world area surrounding the user 110 based on the received sensor data. As the sensor data is received from different input sources (i.e., the plurality of different types of sensors), and the set of relevant objects may already be determined, it may not be needed to execute any computations for all of the determined objects, such as the plurality of objects initially determined by the assistive device 102 within the first proximity range. Thus, any further computations may be executed only for the set of relevant objects and the set of non-relevant objects may be ignored in computations. For example, instead of determining a relative position of each of the plurality of objects with respect to the position of the user 110 of the assistive device 102, only the relative position of each of the set of relevant objects from the plurality of objects may be determined. For instance, from hundreds of objects initially determined and identified, only 10-30 percent of objects may be considered relevant depending on the selected mode. For example, in a case where the mobility mode is selected, objects that may be considered as relevant may be those either assisting in the mobility of the user 110 or creating a hindrance in the mobility of the user 110. In other words, any object which may affect or influence the mobility and navigation of the user 110 with the proximity range may be selected, and other objects (e.g., moving or non-moving objects, such as remote buildings, vehicles, flora, and fauna, not in the way of the user 110 while the user 110 may be walking, may be ignored, and considered as non-relevant objects).

In an implementation, the first proximity range may be set or selected as per the choice of the user 110. For example, the first proximity range may be, for example, 5, 10, or 20 meters. The scaling factor may be higher when the proximity range increases. For instance, the scaling factor may be less for 5 meters as compared to 10 and 20 meters, in an example. Similarly, the scaling factor may be less for nature mode as compared to the mobility mode. If the selected first proximity range is, for example, 10 meters of the surrounding area of the user 110, and the selected mode is the mobility mode, the scaling factor may be computed such that only the set of relevant objects may be mapped to a set of haptic elements of the plurality of haptic elements of the haptic feedback interface 112 whereas the set of non-relevant objects may be ignored.

In accordance with an embodiment, the assistive device 102 may be configured to determine a relative position of each of the set of relevant objects with respect to the position of the user 110 of the assistive device 102. The relative position of each of the set of relevant objects may be determined based on the sensor data received in real time or near-real time from the plurality of sensors 104. In some embodiments, the assistive device 102 may be configured to determine a height and overall size of each of the set of relevant objects from the perspective of the user 110 of the assistive device 102. As the sensor data is received from different input sources (i.e., the plurality of different types of sensors), the information from each sensor may be processed concurrently and information from one sensor may compliment information from other sensor, thereby increasing accuracy of identification of the object-type, and the relative position of each of the set of relevant objects with respect to the position of the user 110 of the assistive device 102. Moreover, as only data associated with the set of relevant objects is processed, the battery consumption of the assistive device 102 is reduced significantly.

The assistive device 102 may be further configured to adjust the sizes of the set of relevant objects to map the set of relevant objects with a set of haptic elements of the plurality of haptic elements of the haptic feedback interface 112. The sizes of the set of relevant objects may be adjusted based on the scaling factor and a count of the set of the relevant objects. Based on the determined scaling factor as well as the count of the set of the relevant objects, the sizes of the set of relevant objects may be adjusted so that the adjusted set of relevant objects may be mapped effectively and accurately to the set of haptic elements of the haptic feedback interface 112. If the count of the set of relevant objects changes in the next time period as compared to a previous time period, the sizes of the set of relevant objects may be further adjusted accordingly. For example, if the count of the set of relevant objects is increased while the proximity range is the same, the sizes of the set of relevant objects may be reduced. Similarly, if the count of the set of relevant objects is decreased while the proximity range is the same, the sizes of the set of relevant objects may be marginally increased. The assistive device 102 may be further configured to generate a touch-discernible feedback on the haptic feedback interface 112 based on the mapping of the set of relevant objects in the adjusted sizes with the set of haptic elements. The assistive device 102 is improved in terms of its functioning, for example, by further enhancing the capability to non-visually discern the 3D real-world area surrounding the user 110 of the assistive device 102 with improved accuracy and at the same time by reducing the feedback time to generate the touch-discernible feedback with reduced clutter on the haptic feedback interface 112.

In the case of the mobility mode, the adjustment of sizes of the set of relevant objects may be applied adaptively to areas beyond a threshold range, for example, about two meters surrounding the user 110, more prominently rather than equally to the whole area of the haptic feedback interface 112 where the touch-discernible feedback is generated. This may not affect the user experience of the user 110 because relevant objects within the threshold range (e.g., about 2 meters in the immediate vicinity) may be more useful for navigation and movement of the user 110 as compared to relevant objects beyond the threshold range. However, in the case of the nature mode, the adjustment of sizes of the set of relevant objects may be applied proportionally to the whole area of the haptic feedback interface 112 where the touch-discernible feedback is generated (i.e., applied almost equally to the set of haptic elements of the haptic feedback interface 112). Moreover, the adjustment of the sizes of the set of relevant objects may be further based on the object type identified for each of the set of relevant objects of the plurality of objects present within the first proximity range.

In accordance with an embodiment, the assistive device 102 may be further configured to merge two or more nearby relevant objects in the set of relevant objects as one relevant object based on: the sensor data received in real-time or near real-time, the first proximity range selected on the assistive device 102, and the mode selected on the assistive device 102. The assistive device 102 may be further configured to map the one relevant object to a corresponding haptic element of the set of haptic elements in the touch-discernible feedback. In other words, the merge two or more nearby relevant objects in the set of relevant objects may be executed while adjusting the sizes of the set of relevant objects to map the set of relevant objects with the set of haptic elements of the plurality of haptic elements of the haptic feedback interface 112.

In accordance with an embodiment, the touch-discernible feedback may comprise a plurality of differential touch-discernible cues to discern a 3D arrangement of each of the set of relevant objects with respect to a position of the user 110 of the assistive device 102. The touch-discernible feedback may be independent of the set of non-relevant objects. The touch-discernible feedback may correspond to at least one of a differential pressure-based, a differential temperature-based, a differential electric pulse-based, a differential raised shape pattern-based touch-discernible feedback. In some embodiments, a combination of different touch-discernible feedback, for example, a combination of the differential electric pulse-based and the differential raised shape pattern-based touch-discernible feedback, may be employed. The 3D arrangement of each of the set of relevant objects may refer to an overall arrangement of the set of relevant objects in a 3D physical space, such as the 3D real-world area surrounding the user 110. As the plurality of differential touch-discernible cues also include a touch-discernible cue that indicates the position of the user 110 in the generated touch-discernible feedback on the haptic feedback interface 112, the 3D arrangement of each of the set of relevant objects from a perspective of user 110 may provide an indication to the user 110 as to where the user 110 is currently present in the 3D real-world area with respect to or in relation to other objects of the set of relevant objects. It may be advantageous to include at least one touch-discernible cue that indicates the position of the user 110 in the generated touch-discernible feedback itself as it enables the user 110 to easily discern the 3D real-world area from the perspective of the user 110 by a touch on the differential touch-discernible cues. An exemplary touch-discernible feedback and exemplary differential touch-discernible cues for the set of relevant objects are shown and described, for example, in FIG. 3C.

In some embodiments, the assistive device 102 may be further configured to control the output audio feedback in combination with the touch-discernible feedback to enable non-visual discern of the 3D real-world area within the first proximity range of the assistive device 102 by the user 110 as the user 110 moves from a first location to a second location in the 3D real-world area within the first proximity range in the selected mode, for example, the mobility mode. The output of the audio feedback may be executed via one or more audio-output devices provided in the assistive device 102. The audio feedback may be provided in sync with the generated touch-discernible feedback. The audio feedback may be generated as the user 110 moves from the first location to the second location in the 3D real-world area within the first proximity range. For example, as the user 110 moves from the first location to a new location (such as the second location) in the 3D real-world area, the audio feedback in combination with the touch-discernible feedback may provide an enhanced understanding of the nearby environment of the user 110 for navigation.

In accordance with an embodiment, the assistive device 102 may be further configured to dynamically update the touch-discernible feedback on the haptic feedback interface 112 based on one or more of a change in position of one or more movable objects of the set of relevant objects while the assistive device 102 is stationary, a change in position the assistive device 102, or a change in a proximity range selection from the first proximity range (e.g., 10 meters) to a second proximity range (20 meters or 40 meters). The assistive device 102 may be further configured to dynamically update the touch-discernible feedback on the haptic feedback interface 112 based on a change in a mode selection from the plurality of defined modes.

In accordance with an embodiment, the assistive device 102 may be further configured to update the mapping of the set of relevant objects to the set of haptic elements on the defined region of the haptic feedback interface 112. The update may be done based on a change in position of one or more movable objects of the determined plurality of objects, including the user 110. The assistive device 102 may be configured to detect the change in real-time or near real-time from the received sensor data. For example, when one or more objects of the plurality of objects move in the 3D real-world area, the generated 3D model at the assistive device 102 may also be updated. Thereafter, the touch-discernible feedback generated previously may be dynamically updated on the haptic feedback interface 112 based on the update of the mapping. Thus, after an initial generation of the touch-discernible feedback, certain portion(s) of the haptic feedback interface 112 needs to be updated instead of the entire haptic feedback interface 112. Thus, the update may be done quickly. In some embodiments, the update may occur periodically. In some embodiments, the update may be done in real-time or near real-time continually as the one or more objects of the plurality of objects move in the 3D real-world area. Some objects which were designated as non-relevant may become relevant and vice-versa depending on such changes and movements of the plurality of objects. The updated touch-discernible feedback enables the user 110 to constantly discern changes in the 3D real-world area surrounding the user 110.

Figure 2:
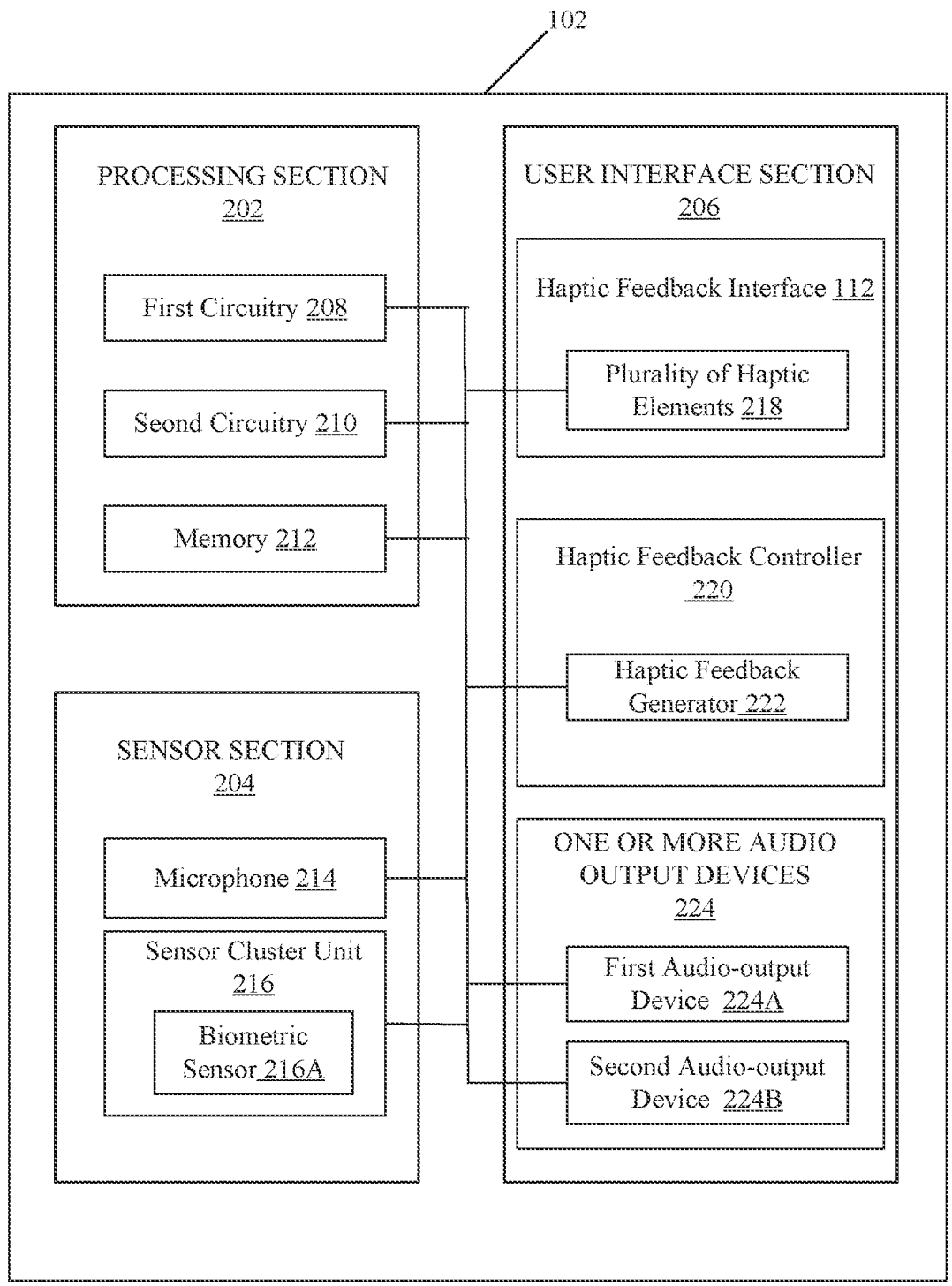
FIG. 2 is a block diagram that illustrates an exemplary assistive device for non-visually discerning a 3D real-world area surrounding a user of the assistive device, in accordance with an embodiment of the disclosure.

FIG. 2 is a block diagram that illustrates an exemplary assistive device for non-visually discerning a 3D real-world area surrounding a user of the assistive device, in accordance with an embodiment of the disclosure. FIG. 2 is explained in conjunction with elements from FIG. 1. With reference to FIG. 2, there is shown the assistive device 102. The assistive device 102 may include a processing section 202, a sensor section 204, and a user interface section 206. The processing section 202 may include a first circuitry 208, a second circuitry 210, and a memory 212. The sensor section 204 may include a microphone 214 and a sensor cluster unit 216. The sensor cluster unit 216 may include at least a biometric sensor 216A. The user interface section 206 may include the haptic feedback interface 112, a haptic feedback controller 220, and one or more audio-output devices, such as a first audio-output device 224A and a second audio-output device 224B. The haptic feedback interface 112 may include a plurality of haptic elements 218. The haptic feedback controller 220 may include a haptic feedback generator 222.

In accordance with an embodiment, the assistive device 102 may be communicatively coupled to the plurality of sensors 104 through the first communication network 108A and/or the second communication network 108B, by use of the first circuitry 208. The second circuitry 210 may be communicatively coupled to the memory 212, and the various components of the sensor section 204 and the user interface section 206, via a system bus.

The first circuitry 208 may comprise suitable logic, circuitry, interfaces, and/or code that may be configured to receive sensor data of the 3D real-world area within a first proximity range of the assistive device 102. The sensor data of the 3D real-world area may be received from the plurality of sensors 104 via the first communication network 108A. In some embodiments, the one or more sensors of the plurality of sensors 104 may be provided as a part of the sensor cluster unit 216 as integrated sensors. In such a case, the sensor data may be acquired by the system bus for processing by the second circuitry 210. The first circuitry 208 may be further configured to communicate with external devices, such as the server 106, via the second communication network 108B. The first circuitry 208 may implement known technologies to support wireless communication. The first circuitry 208 may include, but are not limited to, a transceiver (e.g., a radio frequency (RF) transceiver), an antenna, one or more amplifiers, a tuner, one or more oscillators, a digital signal processor, a coder-decoder (CODEC) chipset, a subscriber identity module (SIM) card, and/or a local buffer.

The first circuitry 208 may communicate via wireless communication with networks, such as the Internet, an Intranet and/or a wireless network, such as a cellular telephone network, a wireless local area network (WLAN), a personal area network, and/or a metropolitan area network (MAN). The wireless communication may use any of a plurality of communication standards, protocols and technologies, such as Global System for Mobile Communications (GSM), Enhanced Data GSM Environment (EDGE), wideband code division multiple access (W-CDMA), code division multiple access (CDMA), LTE, time division multiple access (TDMA), BLUETOOTH™, Wireless Fidelity (Wi-Fi) (such as IEEE 802.11a, IEEE 802.11b, IEEE 802.11g, IEEE 802.11n, and/or any other IEEE 802.11 protocol), voice over Internet Protocol (VoIP), Wi-MAX, Internet-of-Things (IoT) technology, Li-Fi, Machine-Type-Communication (MTC) technology, a protocol for email, instant messaging, and/or Short Message Service (SMS).

The second circuitry 210 may refer a digital signal processor (DSP). The second circuitry 210 may comprise suitable logic, circuitry, interfaces, and/or code that may be configured to generate a 3D model of the 3D real-world area within the first proximity range based on the received sensor data from the plurality of sensors 104 (or the sensor cluster unit 216). The generated 3D model may be mapped to the plurality of haptic elements 218 of the haptic feedback interface 112. The assistive device 102 may be a programmable device, where the second circuitry 210 may execute instructions stored in the memory 212. Other implementation examples of the second circuitry 210 may include, but are not limited to a specialized DSP, a Reduced Instruction Set Computing (RISC) processor, an Application-Specific Integrated Circuit (ASIC) processor, a Complex Instruction Set Computing (CISC) processor, and/or other processors.

The memory 212 may comprise a learning engine. The second circuitry 210 may be configured to determine one or more patterns in a plurality of user interactions on the haptic feedback interface 112 over a period of time, based on a track of a usage pattern of the assistive device 102 by the learning engine. The memory 212 may include suitable logic, circuitry, and/or interfaces that may be configured to store a set of instructions executable by the second circuitry 210. The memory 212 may be further configured to temporarily store one or more captured media streams, such as one or more videos or images of the 3D real-world area within the first proximity range (i.e., an area surrounding the user 110) as image buffer for processing by the second circuitry 210. The memory 212 may also store usage history, an amount of pressure exerted by the user 110 while touching the haptic feedback interface 112 in the plurality of user interactions on the haptic feedback interface 112 over a period of time. The memory 212 may also store input and output preference settings by the user 110. Examples of implementation of the memory 212 may include, but not limited to, a random access memory (RAM), a dynamic random access memory (DRAM), a static random access memory (SRAM), a thyristor random access memory (T-RAM), a zero-capacitor random access memory (Z-RAM), a read only memory (ROM), a hard disk drive (HDD), a secure digital (SD) card, a flash drive, cache memory, and/or other non-volatile memory.

The microphone 214 may comprise suitable circuitry and/or interfaces to receive an audio input. In accordance with an embodiment, the audio input may be provided by the user 110. The audio input may correspond to a voice input to the assistive device 102. In accordance with an embodiment, the microphone 214 may be muted or disabled in accordance with user preferences. Although FIG. 2 shows a single microphone, a person of ordinary skill in the art may understand that the assistive device 102 may include multiple microphones to capture sound emanating from the first proximity range of the user 110 of the assistive device 102. In some embodiments, the assistive device 102 may include a plurality of microphones. Each microphone of the plurality of microphones may be fitted at different locations of the assistive device 102. Based on a difference in the time of receipt of a sound emanated from an object of the plurality of objects in the 3D real-world area, at each of microphone of the plurality of microphones, a direction of the object may be determined. For example, four microphones may be placed at four sides (left, right, top, and bottom) of the assistive device 102. In cases, a sound signal from an object, such as a human or vehicle horn, may be received first at the left microphone, followed by front microphone, and then at remaining microphones. This may indicate that the object may be located at 45-degree angle between left and front direction with respect to the current orientation of the assistive device 102. This information, such as the determined direction of the object, may then be utilized during generation of the touch-discernible feedback or the audio feedback to discern the 3D arrangement of the plurality of objects in the 3D real-world area, as discussed in the FIGS. 2, 3A, 3B, 3C, and 3D.

The sensor cluster unit 216 may include a biometric sensor 216A, such as a fingerprint sensor, to decipher the identity of a user, such as the user 110. In certain scenarios, the assistive device 102 may be used my multiple users, for example, users of a same family. In such a case, based on user authentication by use of the biometric sensor, a different usage profile and user settings may be loaded for different users. In some embodiments, the sensor cluster unit 216 may also include a temperature sensor and a pressure sensor to gauge pressure applied by a user, such as the user 110, on the haptic feedback interface 112. In some embodiments, one or more sensors of the plurality of sensors 104 may be a part of the sensor cluster unit 216. For example, the sensor cluster unit 216 may include the location sensor, the image sensor, the RF sensor, the accelerometer, the gyroscope, the compass, the magnetometer, an integrated image-capture device, the depth sensor, the altimeter, a lux meter, an ultrasound sensor, the IR sensor, or one or more weather sensors.

The haptic feedback interface 112 may comprise the plurality of haptic elements 218. The plurality of haptic elements 218 may refer to an array of cylindrical tubes arranged at the surface of the haptic feedback interface 112. A person of ordinary skill in the art may understand that shape of each tube may be variable, such as conical, hexagonal, or other polygonal shapes, without departing from the scope of the disclosure. In accordance with an embodiment, the plurality of haptic elements 218 may be arranged as a layer (of array of cylindrical tubes) on the haptic feedback generator 222 such that a haptic signal may be generated by the haptic feedback generator 222 through each of the plurality of haptic elements 218. In accordance with an embodiment, one end (e.g. a proximal end) of each tube of the array of cylindrical tubes may be coupled to the haptic feedback generator 222, and the other end (e.g. a distal end) may be interspersed on the haptic feedback interface 112 such that a plurality of differential touch-discernible cues generated by the haptic feedback generator 222 in conjunction with the plurality of haptic elements 218 are discernible on the haptic feedback interface 112 by the sense of touch.

The haptic feedback controller 220 may comprise suitable circuitry and interfaces to control output of a touch-discernible feedback on the haptic feedback interface 112 by the haptic feedback generator 222. The haptic feedback controller 220 may be configured to sense a haptic user input via plurality of haptic elements 218 based on a defined amount of pressure detected at one or more haptic elements of the plurality of haptic elements 218. The haptic feedback controller 220 includes the haptic feedback generator 222. The haptic feedback generator 222 may comprise suitable circuitry and interfaces to receive mapping information from the second circuitry 210. The mapping information corresponds to the mapping of the 3D model that includes a set of relevant objects of the plurality of objects of the 3D real-world area within the first proximity range to a set of haptic elements of the plurality of haptic elements 218. The haptic feedback generator 222 may be configured to generate a touch-discernible feedback on the haptic feedback interface 112 based on the established mapping. The touch-discernible feedback comprises a plurality of differential touch-discernible cues generated on the haptic feedback interface 112 by use of the set of haptic elements of the plurality of haptic elements 218 to enable the user 110 to non-visually discern the 3D real-world area surrounding the user 110 within the first proximity range.

The one or more audio-output devices 224, such as the first audio-output device 224A and the second audio-output device 224B, may comprise suitable circuitry and/or interfaces to generate an audio output for the user 110. In accordance with an embodiment, the audio output may be generated in-sync with the touch-discernible feedback generated on the haptic feedback interface 112. In accordance with an embodiment, the audio output may be generated in-sync with a haptic input received on the haptic feedback interface 112 for multi-sense discerning of the touch-discernible feedback for enhanced understanding of the surrounding of the user 110. The haptic input may be detected by the haptic feedback controller 220 by use of the pressure sensor of the sensor cluster unit 216. In accordance with an embodiment, the one or more audio-output devices 224 may be muted or disabled based on a time-of-day or for a specific location, such as a public library where silence is solicited. Though FIG. 2 is shown to include two audio-input devices, a person of ordinary skill in the art may understand that the assistive device 102 may include a single audio-input device, or more than two audio-input devices. The other speakers may be placed at corners, for example, at extreme left and right corners of the assistive device 102, to aid in voice-based navigation of the user 110 as the user 110 moves with the assistive device 102 from one location to another location in the 3D real-world area. In some embodiments, one or more audio-input devices may be provided or worn at different parts of the body of the user 110 for voice-based navigation of the user 110 as the user 110 moves with the assistive device 102 from one location to another location in the 3D real-world area. Such voice-based navigation may be provided in combination to the generated touch-discernible feedback, which may act synergistically to provide enhanced navigation assistance to the user 110 in real time or near-real time as the user 110 moves in the 3D real-world area. An example is described below in FIG. 2 and FIG. 3C.

Figure 3A:
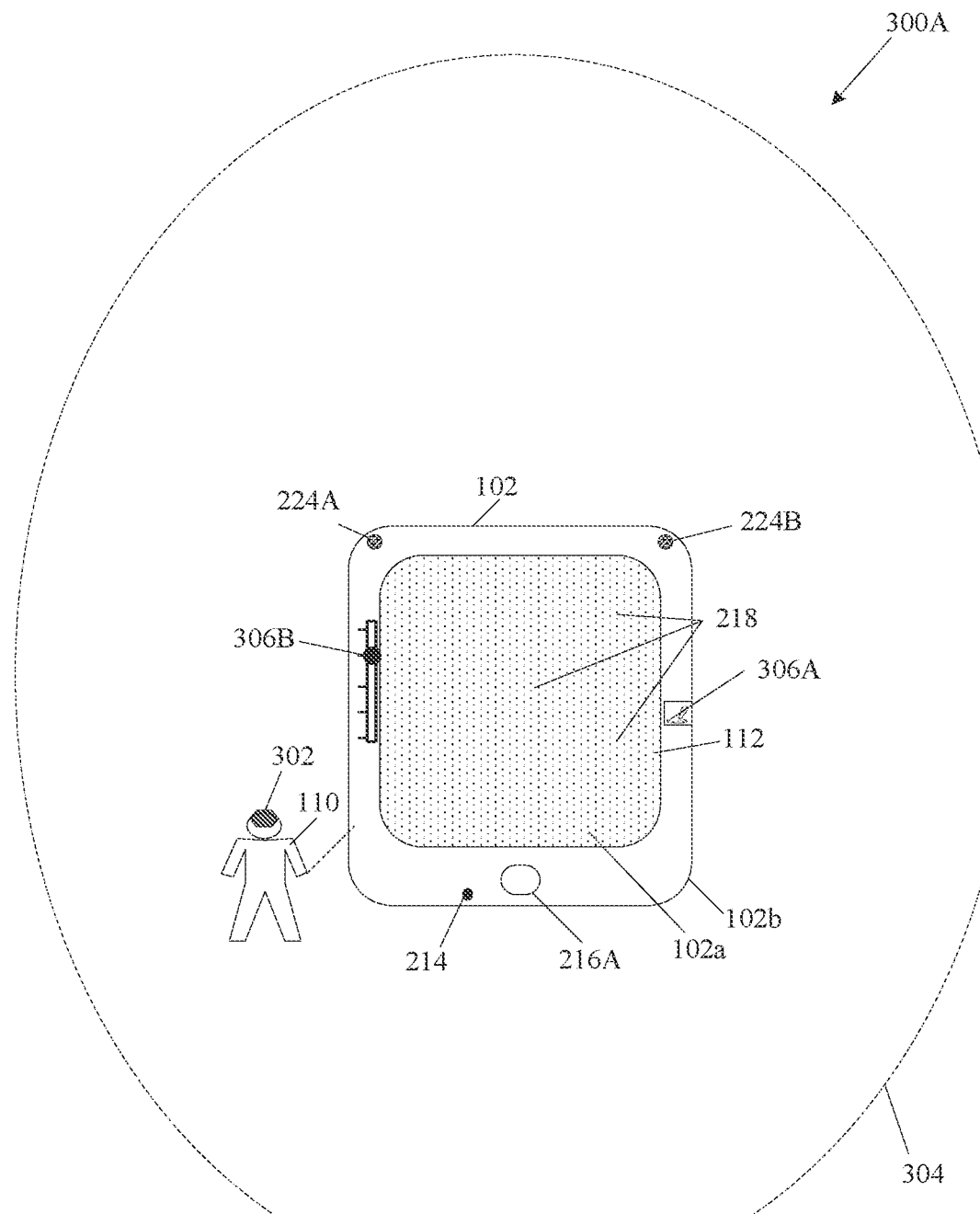
FIGS. 3A, 3B, 3C, and 3D illustrate exemplary scenario diagrams for implementation of the assistive device and method for non-visually discerning a 3D real-world area surrounding a user, in accordance with an embodiment of the disclosure.

FIGS. 3A, 3B, 3C, and 3D illustrate exemplary scenario diagrams for implementation of the assistive device and method for non-visually discerning a 3D real-world area surrounding a user, in accordance with an embodiment of the disclosure. With reference to FIG. 3A, there is a shown a first exemplary scenario 300A, which is described in conjunction with elements from FIGS. 1 and 2. The first exemplary scenario 300A shows the user 110 with the assistive device 102 present in a 3D real-world area. There is also shown the microphone 214, the first audio-output device 224A, the second audio-output device 224B, and the plurality of haptic elements 218 of the haptic feedback interface 112. An image-capture device 302 may be placed worn by the user 110 of the assistive device 102, for example, as a headset or may be a part of the assistive device 102. There is also shown a first proximity range 304 of the assistive device 102. The first proximity range 304 includes a certain portion (or sub-area) of the 3D real-world area surrounding the user 110 of the assistive device 102. There is also shown an upper surface 102*a* and a lower surface 102*b* of the assistive device 102.

In accordance with the first exemplary scenario 300A, the user 110 may be a person with loss of sight or impaired sight. The haptic feedback interface 112 is shown in a first state before the generation of any haptic touch-discernible feedback on the haptic feedback interface 112. The assistive device 102 may receive a voice input from the user 110 via the microphone 214. In accordance with an embodiment, the first audio-output device 224A and the second audio-output device 224B may output audio feedback to aid in voice-based navigation of the user 110 as the user 110 moves with the assistive device 102 from one location to another location in the 3D real-world area. In some embodiments, the lower surface 102*b* of the assistive device 102 may include a holding strap (not shown) in which one hand of the user 110 may be inserted so as to enable the user 110 to hold the assistive device 102 using the one hand while the other hand is free to be placed on the upper surface 102*a* of the assistive device 102 on the haptic feedback interface 112. In accordance with an embodiment, the assistive device 102 may include a plurality of hardware control buttons (not shown), such as a power button to ON/OFF the assistive device 102, a reset button to reset the generated touch-discernible feedback 328 (FIG. 3C) on the haptic feedback interface 112 to the first state, one or more volume control buttons/wheels to control audio output from the first audio-output device 224A and the second audio-output device 224B, a mute button to disable audio output, a proximity range setter to set a proximity range, and the like. The assistive device 102 may further include a mode selector 306A and a proximity range selector 306B. The mode selector 306A may be used to select a mode from a nature mode or a mobility mode. The proximity range selector 306B may be used to adjust the first proximity range 304, for example, to increase or decrease the area to be considered surrounding the user 110, for generation of a touch-discernible feedback. The assistive device 102 may include various other components, as shown in FIG. 2, but for the sake of brevity are excluded from FIG. 3A.

Figure 3B:
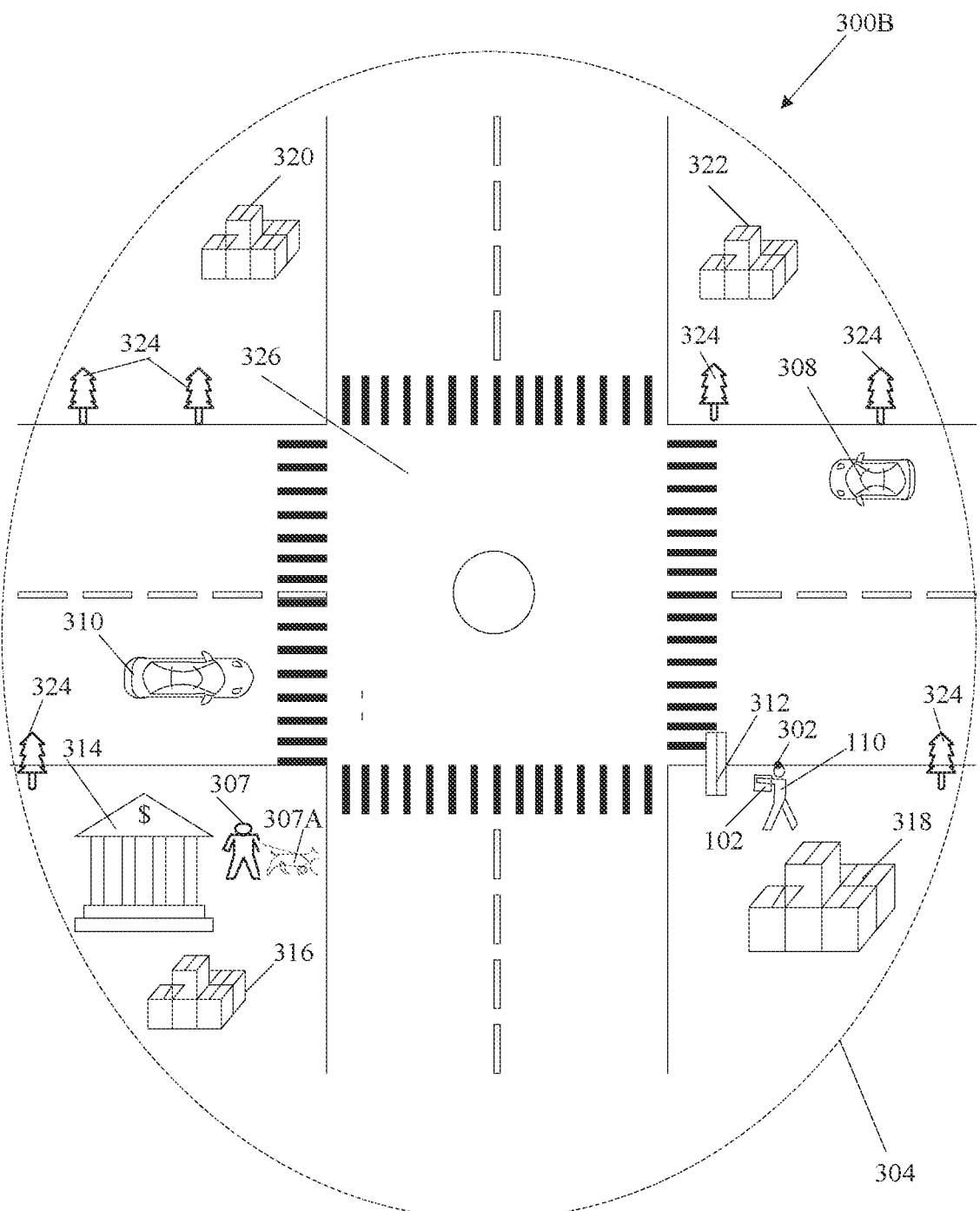

With reference to FIG. 3B, there is shown a second exemplary scenario 300B that depicts the 3D-real world area surrounding the user 110 within the first proximity range 304 (of FIG. 3A) of the assistive device 102. FIG. 3B is explained in conjunction with elements from FIGS. 1, 2, and 3A. In the second exemplary scenario 300B, the 3D-real world area surrounding the user 110 within the first proximity range 304 includes a plurality of different objects. The plurality of different objects may include both moving objects (e.g., the user 110, another person 307 with a pet animal 307A, a first car 308, and a second car 310), and stationary objects (e.g., a pole 312, a plurality of buildings 314, 316, 318, 320, and 322, trees 324 and a four-way street intersection 326. The 3D-real world area surrounding the user 110 within the first proximity range 304 may include many other objects, such as streetlights, and the like, which are not shown for the sake of brevity.

In accordance with the second exemplary scenario 300B, the user 110 may be holding the assistive device 102. The user 110 may press a power "ON" button to initiate receipt of sensor data from the plurality of sensors 104. For example, the image-capture device 302 may be worn as a headset or placed at a suitable position on the body of the user 110 to capture a 360 view of the 3D real-world area that surrounds the user 110 within a first proximity range, for example, "X" meters, where "X" refers to a distance in natural numbers. In accordance with the second exemplary scenario 300B, the first proximity range may be set as 40 meters using the proximity range selector 306B, which is easy-to-use and adjust range for the user 110. The proximity range selector 306B may be a proximity setter wheel or a slider engraved with distances for easy discern by the user 110 for proximity range setting in the assistive device 102. In some embodiments, the first proximity range may be a user-specified default range. In some embodiments, the first proximity range may correspond to an equal 'X' meters range from the center that corresponds to the position of the user 110. In some embodiments, the first proximity range may correspond to an unequal 'X' meters range from the position of the user 110, for example, more area may be covered in front, left, and right of the user 110 based on a direction of movement of the user 110 as compared to the rear area of the user 110.

The first circuitry 208 may be configured to receive sensor data of the 3D real-world area within the first proximity range 304 of the assistive device 102. The sensor data may include the captured 360-degree view of the 3D real-world area that surrounds the user 110 within the first proximity range and RF sensor data that provide an estimation of distances and motion of each the plurality of different objects from the position of the user 110. The sensor data may also include sensed data from the IR sensor of the plurality of sensors 104. The sensed data from the IR sensor may be used to distinguish between living and non-living objects. The sensor data of the 3D real-world area within the first proximity range 304 may be received from the plurality of sensors 104. The plurality of sensors 104 may include wearable sensors that may be worn by the user 110, sensors that may be integrated with the assistive device 102, such as sensors of the sensor cluster unit 216, or sensors provided in other personal devices of the user 110. The sensor data of the 3D real-world area received in real time or near-real time may be used to collect information of the 3D real-world area within the first proximity range 304 of the user 110.

The second circuitry 210 may be further configured to determine a plurality of objects, such as the moving objects (e.g., the user 110, the person 307 with the pet animal 307A, the first car 308, and the second car 310), and stationary objects (e.g., the pole 312, the plurality of buildings 314, 316, 318, 320, and 322, the trees 324, and the four-way street intersection 326, within the first proximity range based on the received sensor data. In the second exemplary scenario 300B, the user 110 may provide an input to select the mobility mode.

Based on the selected mobility mode, the second circuitry 210 may be further configured to determine each of the plurality of objects as a relevant object or a non-relevant object to obtain a set of relevant objects and a set of non-relevant objects. The second circuitry 210 may be configured to determine an object-type of the plurality of objects, a distance of each identified object from the assistive device 102 and a size of the each identified object. A same object-type identifier may be assigned to same or similar types of objects. For example, all human beings present in the first proximity range 304 may be assigned a same object-type identifier (e.g., first object-type identifier). Similarly, all vehicles present in the first proximity range 304 may be assigned a same object-type identifier but different from the object-type identifier assigned to the human beings (e.g., second object-type identifier). The second circuitry 210 may be further configured to estimate whether the plurality of plurality of objects may positively influence or negatively influence or affect the mobility of the user 110 when the user 110 moves within the first proximity range 304 from a first location 328A to a second location 328B. The positive influence may be estimated based on a travel path of the user 110 and the objects that may be in the vicinity of the user 110 along or near the travel path of the user 110, where the objects that may not interrupt or cause any harm or rather assist in mobility of the user 110 may be considered to have positive influence. On the other hand, the objects which may be adversely affect the mobility, cause any potential harm, or cause a risk to accident or block the travel path of the user 110 may be considered to have the negative influence. Further, based on the object-type of the plurality of objects, the distance of each identified object from the assistive device 102, the size of the each identified object, and the estimation of the positive influence and the negative influence, the second circuitry 210 may be further configured to determine each of the plurality of objects as the relevant object or the non-relevant object. For example, based on the selection of the mobility mode, the set of relevant objects determined may be the user 110, the pole 312, the four-way street intersection 326, the person 307 with the pet animal 307A, the second car 310, and the building 314. The buildings 316, 318, 320, and 322, the trees 324, and the first car 308 may be determined as the set of non-relevant objects for the mobility mode.

The second circuitry 210 may be further configured to determine a scaling factor based on the first proximity range 304 and the selected mobility mode. In accordance with an embodiment, the second circuitry 210 may be configured to compute the scaling factor based on the first proximity range 304 selected on the assistive device 102, the selected mobility mode, and a defined region (such as the defined region 330 (FIG. 3C)) of the haptic feedback interface 112 on which a haptic feedback is to be mapped. The scaling factor denotes how much reduction in size and relative adjustment of the size, shape, height, and position of the plurality of different objects may be required to be able to map only the set of relevant objects to a set of haptic elements of the plurality of haptic elements 218 in the defined region of the haptic feedback interface 112. The second circuitry 210 may be further configured to adjust sizes of the set of relevant objects to map the set of relevant objects with a set of haptic elements of the plurality of haptic elements 218 of the haptic feedback interface 112, where the sizes of the set of relevant objects may be adjusted based on the scaling factor and the count of the set of the relevant objects, for example, seven in this case. In accordance with an embodiment, the second circuitry 210 may be configured to establish the mapping of the set of relevant objects to the set of haptic elements of the plurality of haptic elements 218 in the defined region of the haptic feedback interface 112 based on the adjusted sizes of the set of relevant objects. The adjustment of the sizes of the set of relevant objects may be further based on the object-type identified for each of the set of relevant objects of the plurality of objects present within the first proximity range 304. For example, the object, such as the building 314, may be kept larger in size as compared to the object, such as the second car 310, for realistic haptic reproduction. At the time of adjustment of the sizes, the second circuitry 210 may be further configured to merge two or more nearby relevant objects in the set of relevant objects as one relevant object. For example, the person 307 and the pet animal 307A may be merged as one relevant object, and the object identifier of a comparatively larger object, such as only the person 307, may be retained as the merged relevant object as the merge may not negatively influence the mobility of the user 110. The merged relevant object, such as the person 307, may be mapped to a corresponding haptic element of the set of haptic elements.

Figure 3C:
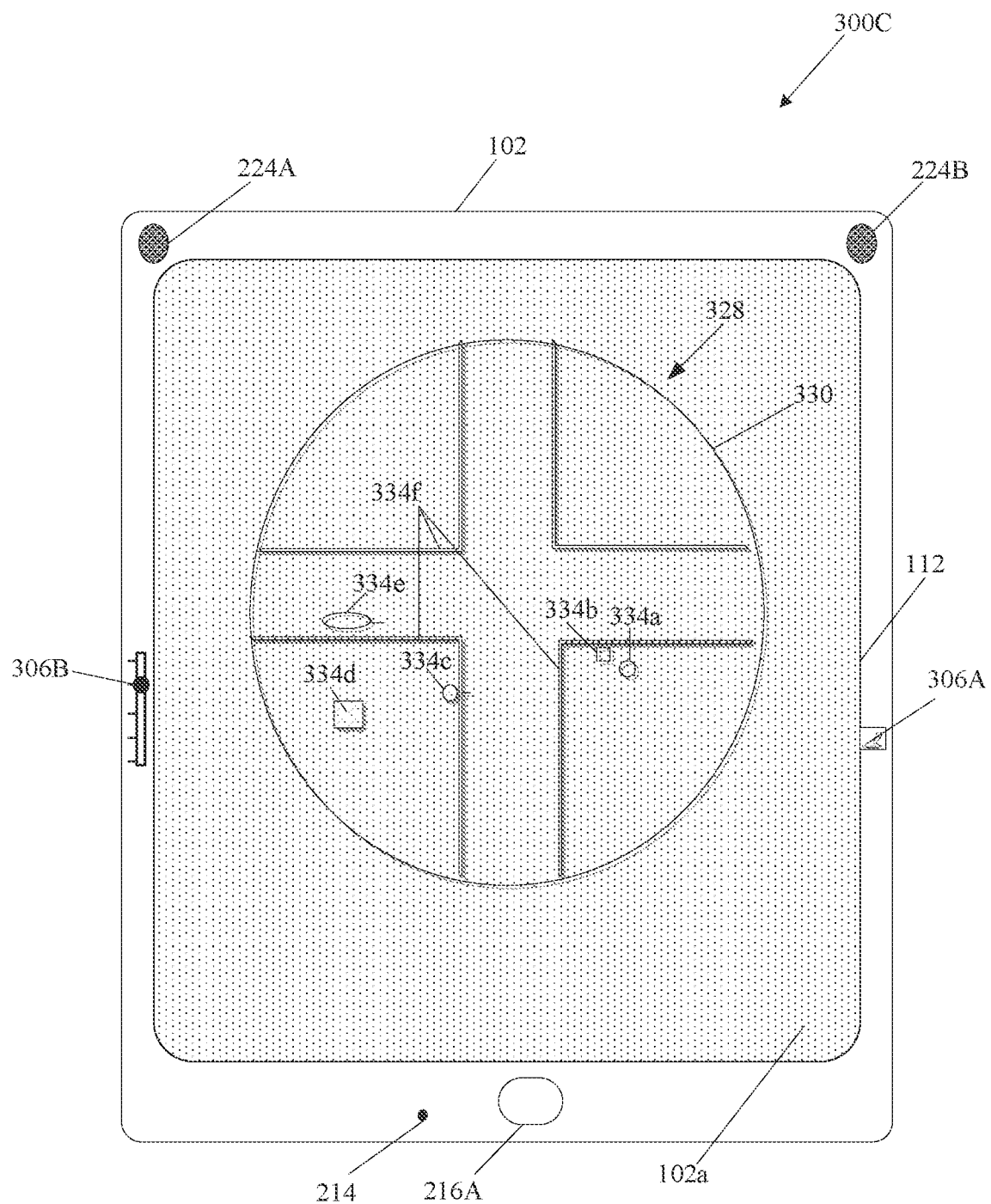

With reference to the FIG. 3C, there is shown a third exemplary scenario 300C that depicts a touch-discernible feedback 328 generated on a defined region 330 of the haptic feedback interface 112. FIG. 3C is explained in conjunction with elements from FIGS. 1, 2, 3A, and 3B. The touch-discernible feedback 328 includes a plurality of differential touch-discernible cues 334a, 334b, 334c, 334d, 334e, and 334f. The plurality of differential touch-discernible cues 334a to 334f represents the set of relevant objects in the 3D real-world area within the first proximity range 304 of the assistive device 102.

The haptic feedback generator 222 may be configured to generate the touch-discernible feedback 328 on the haptic feedback interface 112 based on the mapping of the set of relevant objects in the adjusted sizes with the set of haptic elements 330a in the defined region 330. The touch-discernible feedback 328 may comprise a plurality of differential touch-discernible cues 334a to 334f to discern a 3D arrangement of each of the set of relevant objects with respect to a position of the user 110 of the assistive device 102. For example, the plurality of differential touch-discernible cues 334a to 334f may be generated as the plurality of protrusions of different shapes that are extended from the surface of the haptic feedback interface 112. One shape may be assigned to one identified object-type of the set of relevant objects of the 3D real-world area within the first proximity range 304 to enable the user 110 to discern the object-type when the user 110 touches a protrusion of a defined shape. For example, the touch-discernible cue 334a may be a round protrusion that indicates the position of the user 110 in the 3D real-world area. The touch-discernible cue 334b may be a spike-shaped protrusion that indicates the object-type as pole and the position of the pole 312 in the 3D real-world area. The touch-discernible cue 334c may also be a round protrusion that indicates the object-type as human being and the position of the person 307 (FIG. 3B) in the 3D real-world area. The touch-discernible cue 334d may be square-shaped protrusion that indicate the object-type as building and the positions of the building 314. The touch-discernible cue 334e may be an oval protrusion that indicate the object-type as car and the position of the second car 310 along with a direction of travel discernible by touch. Lastly, the touch-discernible cue 324f may be a first set of raised parallel lines and a second set of raised parallel lines crossing each other at the center that indicate the object-type as "streets intersection" and the positions and layout of the streets of the four-way street intersection 326 (FIG. 3B). Thus, similar to the sighted people who use information about the features on the surface of an object, like color, shading, or overall size, and shape, to recognize an object, the people who have lost the sense of sight may also identity an object-type, object position, a distance from the user 110, and their safe passage in the mobility mode based on a touch on the protrusion of a defined shape in the generated touch-discernible feedback 328, where an association of a particular shape with a particular object-type is learned by brain. The user 110 may discern the 3D real-world area surrounding the user 110 within the first proximity range 304 based on the generated touch-discernible feedback 328, which is a haptic feedback.

In accordance with an embodiment, the second circuitry 210 may be configured to control the output of an audio feedback via the one or more audio-output devices 224 as the user 110 moves in the 3D real-world area within the first proximity range 304. For example, based on the current position of the user 110 (indicated by the touch-discernible cue 324a), an audio feedback may be generated as "There is a pole nearby 4 feet on your right that have a push-to-walk button. Please locate and press the push-to-walk button on the pole 312 to activate the pedestrian walking signal to safely cross the road". Further, the audio feedback via the one or more audio-output devices 224 may provide navigational assistance, for example, turn left, turn right, cross the street, stop here, start moving, and the like, in combination with the generated touch-discernible feedback 328. Such voice-based feedback provided in combination to the generated touch-discernible feedback 328 provide a synergistic and enhanced non-visual navigation assistance to the user 110 in real time or near-real time as the user 110 moves in the 3D real-world area. In some embodiments, the voice-based feedback may be customized output for the user 110, for example, the user 110 may want to reach to the destination, for example, a bank (i.e., the building 314 (FIG. 3B)) from the current location near the pole 312. Thus, customized voice feedbacks may be generated in sequence to provide non-visual navigation assistance to the user 110, for example, turn right and move 4 steps, then turn left and move 5 steps, press the push-to-walk button on the pole 312 on your right, wait for 60 seconds for the pedestrian walk signal, walk signal is now activated, start moving ahead for 30 steps, and the bank (represented by the touch-discernible cue 334d) will be on your left. Turn left and move 7 steps to enter the building 314 (represented by the touch-discernible cue 334d). Thus, based on the learning engine and usage history, the second circuitry 210 may be configured to convert the distance to user steps to enable the user 110 to understand the instructions readily and efficiently in the customized audio feedback in combination with the generated touch-discernible feedback 328. In an implementation, when the user 110 approaches the touch-discernible cue 334c (i.e., the person 307), the second circuitry 210 may be further configured to demerge the touch-discernible cue 334c and another touch-discernible cue (not shown) may appear that may indicate the pet animal 307A in the 3D real-world area. In the FIG. 3C, the touch-discernible feedback 328 is shown that is generated for the mobility mode. In a case where the nature mode is selected, a greater number of objects may be determined as the relevant objects, such as the trees 324, the buildings 316 and 318, the pet animal 307A, and the first car 308 may also be determined as relevant objects in addition to the relevant objects determined in the mobility mode. Thus, the touch-discernible feedback 328 in the nature mode may reproduce such additional relevant objects (not shown) in a similar process of adjustment of sizes based on the scaling factor as for the mobility mode.

Figure 3D:
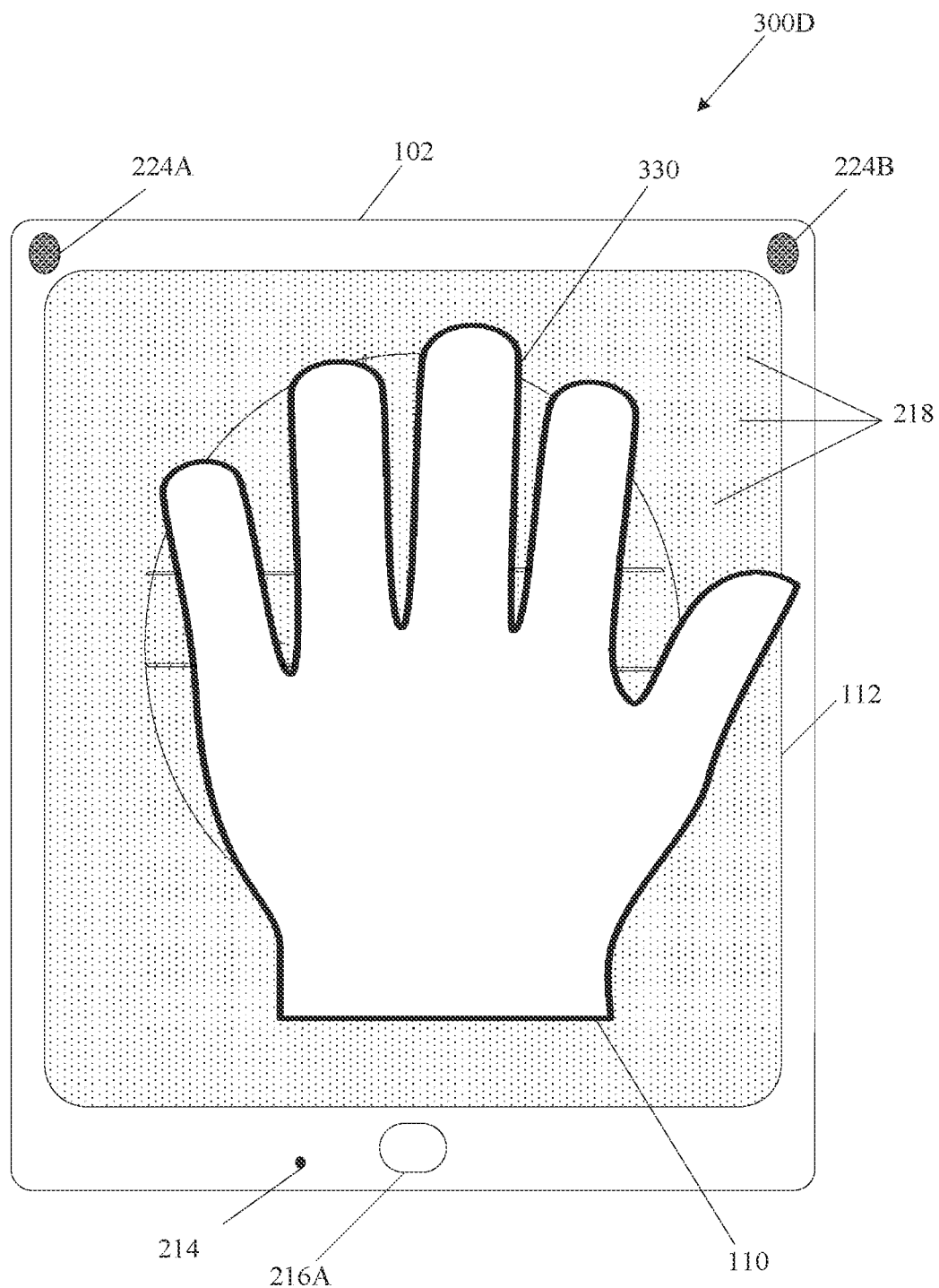

With reference to FIG. 3D, there is shown a fourth exemplary scenario 300D that depicts an exemplary placement of a hand of the user 110 on a defined region 330 of the haptic feedback interface 112 for non-visually discerning the 3D real-world area surrounding the user 110 within the first proximity range 304. It is known that the sense of touch has a much greater sensory resolution than the sense of sight. Hence, the sense of touch can detect even small changes on the surface of the haptic feedback interface 112. The user 110 may non-visually discern the 3D real-world area surrounding the user 110 within the first proximity range 304 by tactioception based on a user touch on the touch-discernible feedback 328 in the defined region 330 of the haptic feedback interface 112. The haptic feedback generator 222 may be configured to dynamically update the touch-discernible feedback 328 and the positions of the one or more touch-discernible cues on the haptic feedback interface 112. The update may be done based on a change in position of one or more movable objects, such as the first car 308, the second car 310, the person 307, the pet animal 307A, and the user 110. The second circuitry 210 may be configured to detect the change in real-time or near real-time from the received sensor data and signal the changes to the haptic feedback generator 222 to update the touch-discernible feedback 328.

In some embodiments, the assistive device 102 may be implemented as a hand-held portable device. In some embodiments, the assistive device 102 may be implemented as one or more wearable devices that may be worn around at different parts of the human body having sensory receptors that senses touch. In such embodiments, the haptic feedback interface 112 may be a foldable or bendable layer of pad or wrap band that may be worn on different parts of the body a user, such as the user 110. The assistive device 102 may also include pads, bands, or straps, to enable the assistive device 102 to be worn at different parts of the body of the user 110. For example, the assistive device 102 may be implemented as specialized hand gloves, where multiple haptic feedback interfaces (similar to the haptic feedback interface 112) may be in contact with skin of both the upper side and lower side (i.e., palm) of one or both hands of the user 110 to convey information of the 3D real-world area in the form of the touch-discernible haptic feedback generated by the haptic feedback generator 222.

In one example, the assistive device 102 with the haptic feedback interface 112 may be worn as a shoe sole that provides touch-discernible haptic feedback. In some embodiments, multiple assistive devices with the haptic feedback interface 112 may be worn, for example, one as a shoe sole and other as a hand-held device. In another example, the assistive device 102 with the haptic feedback interface 112 may be wrapped around one or both forearms of a human body, such as the user 110. Thus, similar to the hand-held device, when the assistive device 102 is worn, the skin of the user 110 (e.g., sensory receptors at skin of the forearms, thigh, waist, leg, feet, and the like) may feel the plurality of differential touch-discernible cues 334a to 334f in the touch-discernible feedback 328 without a touch by a hand or finger(s) of hand for non-visually discerning the 3D real-world area surrounding the user 110 within the first proximity range 304. In FIGS. 3C and 3D, the plurality of differential touch-discernible cues, for example, are shown to be generated as a plurality of different protrusions of different shapes. However, the plurality of differential touch-discernible cues may also be generated as different level of electric-pulses, different amount of pressure or pain, different level of temperature, or their combination, on the haptic feedback interface 112 by the haptic feedback generator 222.

In accordance with an embodiment, the assistive device 102 may include a view-change button. The view-change button may be used by the user 110 to change the capture of sensor data for a front area of the 3D-real world area instead of all the area within the first proximity range 304. Thereby, the touch-discernible feedback may be generated for the front area of the 3D-real world area (i.e., a front view from the perspective of user 110). Similarly, a second press on the view-change button may result in the generation of the touch-discernible feedback for rear view, for example, to view an area behind the user 110. In some embodiments, the haptic feedback interface 112 may comprise a plurality of defined regions, for example, two defined regions. A first defined region of the plurality of defined regions may be configured to generate a first touch-discernible feedback for the front view, whereas a second defined region of the plurality of defined regions may be configured to generate a second first touch-discernible feedback for the rear-view from the perspective of the user 110. In some embodiments, the modality of generation of the plurality of differential touch-discernible cues for the first touch-discernible feedback may be the same as the second first touch-discernible feedback. In some embodiments, the modality of generation of the plurality of differential touch-discernible cues for the first touch-discernible feedback may be different from the second first touch-discernible feedback. The modality of generation of the plurality of differential touch-discernible cues corresponds to the generation of the plurality of differential touch-discernible cues as different protrusions of different shapes, different level of electric-pulses, different amount of pressure or pain, different level of temperature, or their combination, on the haptic feedback interface 112.

As there may be hundreds of objects in the real-world surroundings of the user 110, processing all such surrounding objects may increase the processing load and drain battery during the operation of the assistive device 102, which is not desirable. Beneficially, the assistive device 102 not only significantly reduces the battery consumption but also improves the generated touch-discernible feedback 228 by increasing the accuracy in the determination of the scaling factor as the assistive device 102 takes into account the selected mode along with the selected proximity range. Moreover, only the set of relevant objects may be considered for the adjustment of their object sizes and the generation of feedback layout, which reduces the processing load and reduces clutter in the layout of the generated touch-discernible feedback 228, thereby enhancing the capability to non-visually discern the 3D real-world area surrounding the user 110. The assistive device 102 further considers the count of the set of the relevant objects in addition to the determined scaling factor to adjust the sizes of the set of relevant objects, which further improves the performance of the assistive device 102 in terms of reducing the processing load, battery consumption, while improving the feedback time and ease of use. Thus, such powerful non-visual senses, such as the sense of touch, may be harnessed in an improved manner to help people that have lost or impaired the sense of sight to better understand and navigate the world in a more effective manner. These powerful non-visual senses may also be used effectively in certain situations where human vision is of limited use, for example, in areas that are devoid or partially devoid of light.

Figure 4A:
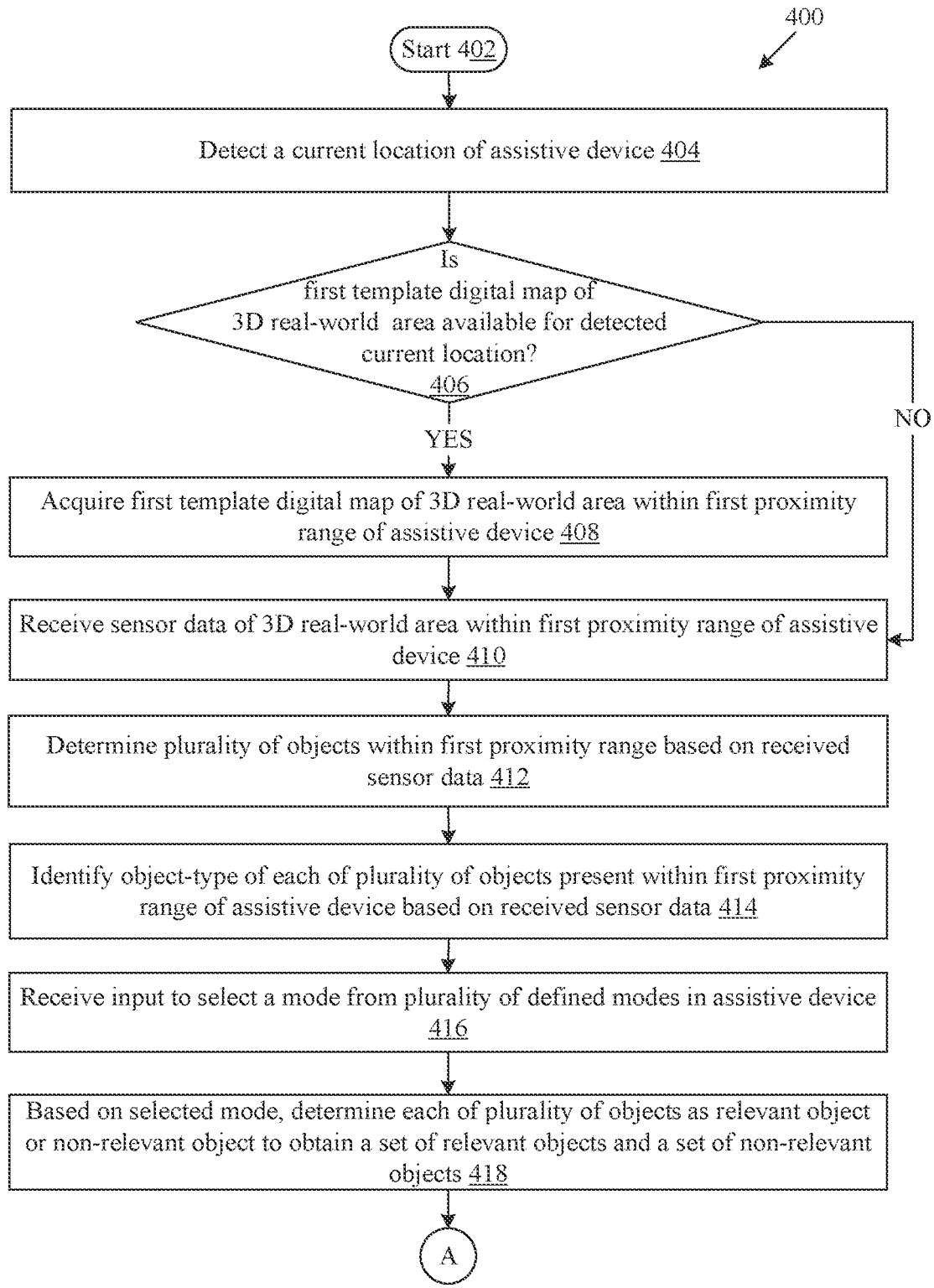
FIGS. 4A, 4B, and 4C collectively, depict a flow chart that illustrates a method for non-visually discerning a 3D real-world area surrounding a user, in accordance with an embodiment of the disclosure.
Figure 4B:
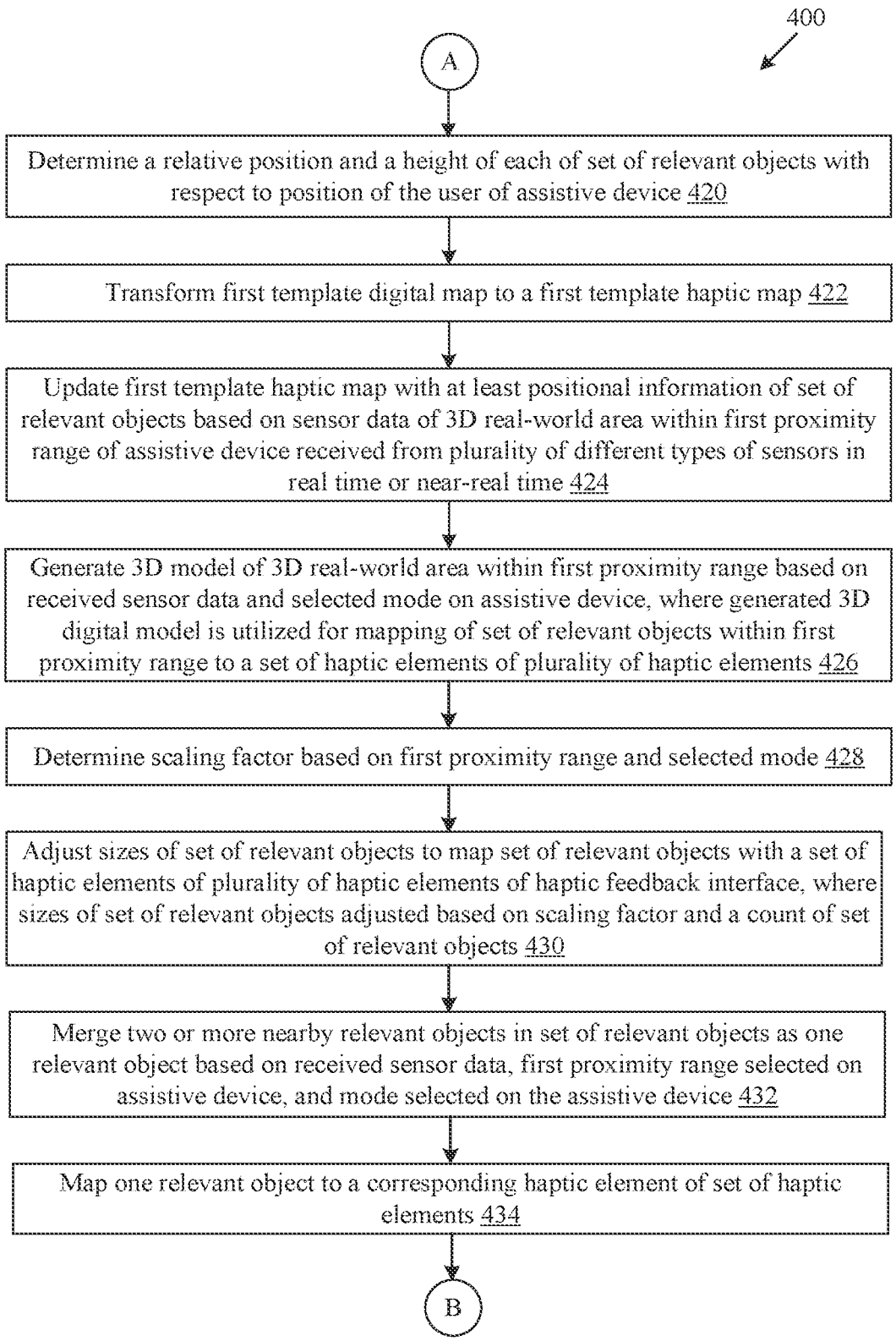
Figure 4C:
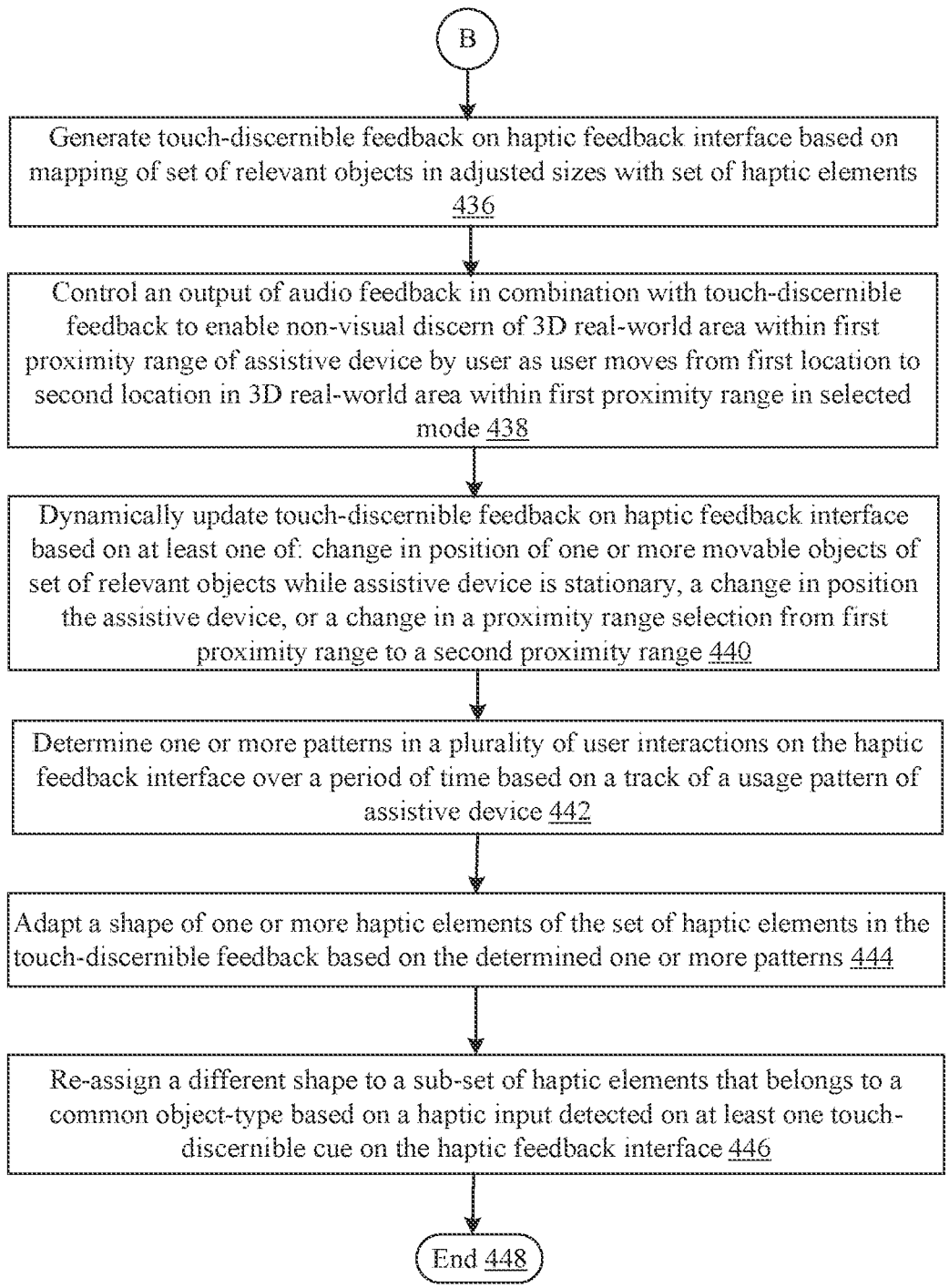

FIGS. 4A, 4B, and 4C collectively, depict a flowchart 400 that illustrates a method for non-visually discerning a 3D real-world area surrounding a user, in accordance with an embodiment of the disclosure. FIGS. 4A, 4B, and 4C are described in conjunction with elements from the FIGS. 1, 2, and 3A to 3D. As shown in FIG. 4A, the method of the flowchart 400 starts at 402 and proceeds to 404.

At 404, a current location of the assistive device 102 may be detected. The second circuitry 210 may be configured to detect the current location of the assistive device 102, by use of the location sensor. As the user 110 may be equipped with the assistive device 102, the location of the assistive device 102 may be same as that of the user 110. The location sensor may be an integrated sensor of the assistive device 102 provided in the sensor cluster unit 216 or may be one of the plurality of sensors 104. The assistive device 102 may be a hand-held device or a wearable device.

At 406, it may be determined whether a first template digital map of a 3D real-world area for the current location of the assistive device 102 is available. The second circuitry 210 may be configured to determine whether the first template digital map of the 3D real-world area for the detected current location of the assistive device 102 is available. The availability of the first template digital map of a 3D real-world area may be determined at the server 106 or the memory 212. In cases where the first template digital map is available, the control passes to 408, else to 410.

At 408, a first template digital map of a 3D real-world area within a first proximity range of the assistive device 102 may be acquired based on a position of the assistive device 102. In some embodiments, where the first template digital map of the 3D real-world area is available, the first circuitry 208 may be configured to acquire the first template digital map of the 3D real-world area within the first proximity range (e.g., the first proximity range 304) of the assistive device 102. In accordance with an embodiment, the first template digital map may be acquired from the server 106 based on the current location of the assistive device 102. As the user 110 may be equipped with the assistive device 102, the location of the assistive device 102 may be same as that of the user 110. In some embodiments, the memory 212 may store 2D/3D maps of geographical regions of the earth surface, such as street views. In such a case, the second circuitry 210 may be configured to retrieve the first template digital map of the 3D real-world area from the memory 212. The first template digital map may be available for certain outdoor areas, whereas such maps may not be available for indoor areas.

At 410, sensor data of the 3D real-world area within the first proximity range of the assistive device 102 may be received. The first circuitry 208 may be configured to receive sensor data of the 3D real-world area within the first proximity range (e.g., the first proximity range 304) of the assistive device 102 from the plurality of sensors 104 that are communicatively coupled to the assistive device 102. In some embodiments, the sensor data may also be received from the sensor cluster unit 216. In some embodiments, the first template digital map of a 3D real-world area may not be acquired, for example, in case of indoor locations or for regions where the first template digital map may not be available. In such a case, the sensor data of the 3D real-world area received in real time or near-real time may be used to collect information of the 3D real-world area within the first proximity range (e.g., the first proximity range 304) of the assistive device 102.

At 412, a plurality of objects within the first proximity range (e.g., the first proximity range 304) may be determined based on the received sensor data. The second circuitry 210 may be further configured to determine the plurality of objects within the first proximity range 304 based on the received sensor data. The use of the plurality of sensors 104 results in faster and more accurate determination of the plurality of objects as compared to sensor data received exclusively from one type of sensor, such as the image-capture device or in different environmental or weather conditions, for example, rain, hailstorm, during night, and the like. Although, an approximate distance of different objects in an image frame may be estimated by image processing, the distance or position of objects calculated from RF sensor or the LIDAR, may be faster and more accurate as compared to the image-processing methods.

At 414, an object-type of each of the plurality of objects present within the first proximity range (e.g., the first proximity range 304) of the assistive device 102 may be identified, based on the received sensor data. The second circuitry 210 may be further configured to identify the object-type of each of the plurality of different objects present within the first proximity range of the assistive device 102 based on the received sensor data. For example, the assistive device 102 may be configured to identify whether an object is a building, a human, an animal (which animal), a road, a traffic light, a tree, a plant, a pedestrian crossing, a pedestrian path, such as a sidewalk path, moving objects, such as a two-wheeler, a three-wheeler, a four-wheeler, stairs, an obstacle, etc.

At 416, an input may be received to select a mode from a plurality of defined modes in the assistive device 102. The second circuitry 210 may be further configured to receive the input to select the mode from the plurality of defined modes in the assistive device 102. The plurality of defined modes may comprise a nature mode and a mobility mode. The assistive device 102 provides the plurality of defined modes when which used provides a capability to the assistive device 102 to determine whether the plurality of objects determined using the sensor data are indeed relevant or non-relevant objects for the user.

At 418, based on the selected mode, each of the plurality of objects may be determined as a relevant object or a non-relevant object to obtain a set of relevant objects and a set of non-relevant objects. In some implementations, the plurality of objects may be determined as the relevant object, or the non-relevant object further based on the identified object-type of each of the plurality of objects and the selected mode. In accordance with an embodiment, the plurality of objects may be determined as the relevant object, or the non-relevant object further based on the identified object-type of each of the plurality of objects and the selected mode. Moreover, the resolution of the 3D real-world area within the first proximity range may be higher when the selected mode is the nature mode as compared to the mobility mode. For example, the user 110 may be able to non-visually discern more objects present in the 3D real-world area within the first proximity range in the nature mode as compared to the mobility mode. An example of the determination of the set of relevant objects and the set of non-relevant objects, has been shown and explained, for example, in FIG. 3B.

At 420, a relative position and a height of each of the set of relevant objects with respect to the position of the user 110 of the assistive device 102 may be determined. The second circuitry 210 may be configured to determine the relative position of each of the set of relevant objects with respect to the position of the user 110 of the assistive device 102. The relative position of each of the set of relevant objects may be determined based on the sensor data received in real time or near-real time from the plurality of sensors 104 worn by the user 110.

At 422, the first template digital map may be transformed to a first template haptic map. The first template digital map may include huge amount of information, out of which mainly a template of basic layout of roads and road-side objects may be sufficient instead of all details, for example, elevation of buildings. The first template digital map may be processed (or pre-processed in advance for a map of a city or a country) and transformed to the first template haptic map, which is comparatively less in size and include a down-scaled size of objects and basic layout of roads which may be compatible for haptic reproduction with reduced processing load.

At 424, the first template haptic map may be updated with at least positional information of the set of relevant objects based on the sensor data of the 3D real-world area within the first proximity range of the assistive device 102 received from the plurality of different types of sensors in real time or near-real time. The second circuitry 210 may be configured to update the first template haptic map in real time or near-real time based on the sensor data of the 3D real-world area.

At 426, a 3D model of the 3D real-world area within the first proximity range may be generated based on the received sensor data and the selected mode on the assistive device 102, where the generated 3D digital model is utilized for mapping of the set of relevant objects within the first proximity range to a set of haptic elements of the plurality of haptic elements 218. The second circuitry 210 may be configured to generate the 3D model of the 3D real-world area. The 3D model may be representative model of the 3D real-world area within the first proximity range (e.g., the first proximity range 304) including information of each of the set of relevant objects.

At 428, a scaling factor may be determined based on the first proximity range and the selected mode. The second circuitry 210 may be further configured to determine the scaling factor in accordance with the first proximity range, the selected mode, and an area of a defined region of the haptic feedback interface 112. The second circuitry 210 may be further configured to compute a scaling factor in accordance with the first proximity range and a surface area of the haptic feedback interface 112 or a surface area of a defined region of the haptic feedback interface 112. The defined region of the haptic feedback interface 112 may refer to an overall surface area of the haptic feedback interface 112 on which a haptic feedback is to be generated. An example of the defined region (e.g., the defined region 322) of the haptic feedback interface 112 is shown in FIGS. 3C and 3D.

At 430, sizes of the set of relevant objects may be adjusted to map the set of relevant objects with a set of haptic elements of the plurality of haptic elements 218 of the haptic feedback interface 112, where the sizes of the set of relevant objects may be adjusted based on the scaling factor and a count of the set of the relevant objects. The second circuitry 210 may be further configured to adjust the sizes of the set of relevant objects to map the set of relevant objects with the set of haptic elements. In an implementation, the adjustment of the sizes of the set of relevant objects may be further based on the object-type identified for each of the set of relevant objects of the plurality of objects present within the first proximity range. A mapping of only the set of relevant objects within the first proximity range may be established to set of haptic elements of the plurality of haptic elements 218 of the haptic feedback interface 112. Based on the determined scaling factor as well as the count of the set of the relevant objects, the sizes of the set of relevant objects may be adjusted so that the adjusted set of relevant objects may be mapped effectively and accurately to the set of haptic elements of the haptic feedback interface 112. In accordance with an embodiment, the generated 3D model may be utilized for the adjustment of sizes followed by mapping of the set of relevant objects within the first proximity range to the set of haptic elements.

At 432, two or more nearby relevant objects in the set of relevant objects may be merged as one relevant object based on the received sensor data, the first proximity range selected on the assistive device 102, and the mode selected on the assistive device 102. The second circuitry 210 may be further configured to merge the two or more nearby relevant objects in the set of relevant objects as one relevant object. An example of the merging of the two or more nearby relevant objects is shown and explained, for example, in FIGS. 3B, 3C, and 3D.

At 434, the merged relevant object may be mapped to a corresponding haptic element of the set of haptic elements. The second circuitry 210 may be further configured to map the merged relevant object to the corresponding haptic element of the set of haptic elements. An example of the mapping of the merged relevant object is shown and explained, for example, in FIGS. 3B and 3C.

At 436, a touch-discernible feedback (e.g., the touch-discernible feedback 328) may be generated on the haptic feedback interface 112 based on the mapping of the set of relevant objects in the adjusted sizes with the set of haptic elements. The haptic feedback generator 222 may be configured to generate the touch-discernible feedback on the haptic feedback interface 112. The touch-discernible feedback (e.g., the touch-discernible feedback 328) may comprise a plurality of differential touch-discernible cues to discern a 3D arrangement of each of the set of relevant objects with respect to a position of the user 110 of the assistive device 102, where the touch-discernible feedback may be independent of the set of non-relevant objects. The haptic feedback generator 222 also generates the plurality of differential touch-discernible cues to discern different identified object-types of the set of relevant objects present within the first proximity range of the assistive device 102. The resolution of the 3D real-world area within the first proximity range is higher when the selected mode is the nature mode as compared to the mobility mode. The plurality of differential touch-discernible cues refers to touch-discernible cues generated on the haptic feedback interface that may be dissimilar or different in one or more physical characteristics or properties such that a user may discern their disparate form by tacioperception. The one or more physical characteristics or properties, for example, may be shape, size, smoothness, roughness, temperature, amount of pressure, pain, level of elevation, a pattern of distribution, and the like, which may be discernible by touch. In accordance with an embodiment, the plurality of differential touch-discernible cues may be generated as a plurality of protrusions of different shapes that are extended from the surface of the haptic feedback interface 112. Each protrusion may be a raised shape-pattern or a bulge that sticks out from at least one or a group of haptic elements of the plurality of haptic elements 218 of the haptic feedback interface 112. The plurality of protrusions represents the set of relevant objects of the 3D real-world area within the first proximity range. One shape may be assigned to one identified object-type of the set of relevant objects of the 3D real-world area within the first proximity range to enable the user 110 to discern the object-type when the user 110 touches a protrusion of a defined shape. For example, an oval shape protrusion may denote a particular object-type, for example, a car. An example of the oval shape protrusion may be the touch-discernible cue 334e, as shown in FIG. 3C. A round protrusion may denote a human being. Examples of the round protrusion may be the touch-discernible cues 334a and 334c, as shown in FIG. 3C. A square-shaped protrusion may denote a building, and a pole-like or a spike-like protrusion may denote a pillar or a pole in the 3D real-world area within the first proximity range. Examples of the square-shaped protrusion may be the touch-discernible cue 334d, as shown in FIG. 3C. An example of the pole-like or a spike-like protrusion may be the touch-discernible cue 334b as shown in FIG. 3C. Thus, when the user 110 touches the oval shape protrusion, the user 110 may readily identify the protrusion to be a car. Thus, similar to the sighted people who use information about the features on the surface of an object, like color, shading, or overall size, and shape, to recognize an object, the people who have lost the sense of sight may also identity an object based on a touch on the protrusion of a defined shape, where an association of a particular shape with a particular object-type is learned by brain.

In accordance with an embodiment, the plurality of protrusions generated on the haptic feedback interface 112 enables the user 110 to discern not only the object-type but also a relative positioning of the set of relevant objects from the perspective of the user 110. Further, as the set of relevant objects are mapped to the set of haptic elements of the plurality of the haptic elements 218 of the haptic feedback interface 112, a 3D arrangement of the set of relevant objects is discernible by touch on the plurality of differential touch-discernible cues that are generated as the plurality of protrusions of different shapes extended from the surface of the haptic feedback interface 112. The 3D arrangement may indicate not only the position or distance of each object of the set of relevant objects from the user 110 of the assistive device 102, but also may indicate a relative size or direction of travel of objects for moving objects.

In accordance with an embodiment, the plurality of protrusions may have the same shape. In such a case, although it may be relatively difficult to identity an object-type, however, the relative position of each of the set of relevant objects from the position of the user 110 may be easily discernible by touch on the plurality of protrusions. Further, as the user 110 is present in the 3D real-world area, the user 110 may hear actual sound emanated from one or more objects of the set of relevant objects. Hence, the user 110 may correlate the plurality of protrusions with the plurality of sounds to discern an object-type or estimate an approximate distance to an object of the set of relevant objects. The haptic feedback generator 222 may be configured to control the extending and the retracting of the plurality of protrusions by use of the plurality of haptic elements 218. The haptic feedback generator 222 may be configured to control grouping of the plurality of haptic elements 218 during extension to represent a particular shape for a protrusion. In accordance with an embodiment, the protrusion may be static or may be deformable. The same protrusion may have different meanings based on the deformation. For example, a 3D real-world area surrounding the user 110 may include a sportsman in a playground. The sportsman while playing a soccer game may be standing on the playground or may be walking, and suddenly fell down. In such as a case, the protrusion (that may represent the sportsman) may be deformed to represent a sudden change for the same object in the 3D real-world area. The sudden change may be discernible by the user 110 in the generated touch-discernible feedback for the playground, based on the touch-discernible cue of the deforming protrusion. In some embodiments, the user 110 may be present on a river side and use the assistive device 102 to generate a touch-discernible feedback of the 3D real world area surrounding the user 110. A certain raised shape pattern generated on the haptic feedback interface 112 may represent water body (e.g., a river) ahead of the user 110. The raised shape pattern may be a constantly deforming protrusion. Based on a touch on the constantly deforming protrusion, the user 110 may discern not only a presence of a waterbody, such as the river, based on a touch on the constantly deforming protrusion but also an exact location of the river, and the relative position of the user 110 from the water body in the generated touch-discernible feedback.

In accordance with an embodiment, the plurality of protrusions may be generated by application of different temperatures on different surface area of the haptic feedback interface 112. In such an embodiment, the haptic feedback interface 112 may include a covering on the upper surface (such as the upper surface 102*a* (FIG. 3A)). The covering may be a polymer-based layer sensitive to temperature. The plurality of the haptic elements 218 may be arranged as the array of cylindrical tubes below the covering. In cases where, a localized high temperature is generated through one or a group of the haptic elements of the plurality of haptic elements 218, a bulge may appear on the covering of the haptic feedback interface 112. Similarly, different bulge portions may represent the plurality of protrusions. Notwithstanding, the plurality of protrusions may be generated by various methods, such as by electro-chemical process, without limiting the scope of the disclosure. In accordance with an embodiment, the plurality of differential touch-discernible cues may be generated as different level of electric-pulses or a different amount of pressure, such as pain points (or pricking points) that may represent the positioning of the plurality of objects of the 3D real world area in the generated touch-discernible haptic feedback.

In accordance with an embodiment, the plurality of differential touch-discernible cues may be generated as multi-level pressure on the haptic feedback interface 112 by the haptic feedback generator 222. For example, a first object of the set of relevant objects in the 3D real-world area may be discernible by generating a haptic signal through one or more haptic elements of the plurality of haptic elements 218 as a first amount of pressure. This first amount of pressure may be felt by the user 110 when the user 110 touches a specific portion, for example, a first portion, of the haptic feedback interface 112. Similarly, for each position of different objects of the set of relevant objects, a different amount of pressure may be generated on the haptic feedback interface 112. Thus, the user 110 may feel different amount of pressure at different points (or portions) on the haptic feedback interface 112. The different amount of pressure enables the user 110 (by touch on the haptic feedback interface 112) to non-visually discern the relative positioning of the set of relevant objects of the 3D real world area. The different amount of pressure in the generated touch-discernible haptic feedback corresponds to the plurality of differential touch-discernible cues generated as multi-level pressure.

In accordance with an embodiment, the plurality of differential touch-discernible cues may be generated as different temperatures, for example, different combination of hot and cold temperatures, on the haptic feedback interface 112 by the haptic feedback generator 222. For each position of different objects of the plurality of objects, a different temperature level may be generated on the haptic feedback interface 112 through one or more haptic elements of the plurality of haptic elements 218. The different level of temperature enables the user 110 (by touch on the haptic feedback interface 112) to non-visually discern the relative positioning of the set of relevant objects including the user 110 in the 3D real world area.

In accordance with an embodiment, the plurality of differential touch-discernible cues may be generated as different level of electric-pulses on the haptic feedback interface 112 by the haptic feedback generator 222. For each position of different objects of the set of relevant objects, a different level of electric pulse may be generated on the haptic feedback interface 112 through a haptic element of the plurality of haptic elements 218. The different level of electric pulses enables the user 110 (by touch on the haptic feedback interface 112) to non-visually discern the relative positioning of the set of relevant objects of the 3D real world area. The different amounts of electric pulses in the generated touch-discernible haptic feedback corresponds to the plurality of differential touch-discernible cues generated as different level of electric-pulses. Further, when an object of the set of relevant objects moves in the 3D real-world area, an electric pulse (i.e., a touch-discernible cue) may also be felt on the haptic feedback interface 122 to be moving as a continuous line from one point of the haptic feedback interface 122 to another point to represent the movement and a direction of movement of the object of the set of relevant objects in the 3D real-world area. The generation of electric-pulse (i.e., a touch-discernible cue) along a certain path on the haptic feedback interface 122 may be synchronized to the actual movement of the object in the 3D real-world area. This allows the user 110 to understand the path of movement of the object simply by placing one hand on a defined region of the haptic feedback interface 112, as shown in FIG. 3D. In case of the assistive device 102 is a wearable device, similar touch-discernible cues (e.g. different amount of pressure, different level of electric-pulses, different temperatures (such as hold and cold), different shape patterns, static or deformable protrusions, movement of touch-discernible cues), may be felt based on the contact of the skin of the user 110 with the haptic feedback interface 112 that may be wrapped on a body part, such as waist, or arm, as a wrap band, or worn as a pad. The movement of a touch-discernible cue, for example, a particular electric-pulse running from one point to another point of the haptic feedback interface 112, may further indicate a movement of an object of the set of relevant objects in the 3D real-world area in the first proximity range of the user 110.

At 438, an output of an audio feedback may be controlled in combination with the touch-discernible feedback to enable non-visual discern of the 3D real-world area within the first proximity range of the assistive device 102 by the user 110 as the user 110 moves from a first location to a second location in the 3D real-world area within the first proximity range in the selected mode. The second circuitry 210 may be configured to control the output of the audio feedback via the one or more audio-output devices 224 as the user 110 moves from a first location to a second location in the 3D real-world area within the first proximity range.

At 440, the touch-discernible feedback (e.g., the touch-discernible feedback 328) may be dynamically updated on the haptic feedback interface 112 based on at least one of: a change in position of one or more movable objects of the set of relevant objects while the assistive device 102 may be stationary, a change in position the assistive device 102, or a change in a proximity range selection from the first proximity range to a second proximity range. In an implementation, the haptic feedback generator 222 may be further configured to dynamically update the touch-discernible feedback on the haptic feedback interface based on a change in a mode selection from the plurality of defined modes. The second circuitry 210 may be configured to detect the change in real time or near-real time from the received sensor data. The haptic feedback generator 222 may be configured to dynamically update the touch-discernible feedback on the haptic feedback interface 112 in conjunction with the second circuitry 210 and the haptic feedback controller 220. The updated touch-discernible feedback may also include a change in the relative positions of one or more of the set of relevant objects with respect to the position of the user 110 of the assistive device 102.

In accordance with an embodiment, the haptic feedback generator 222 may be configured to update the mapping of the set of relevant objects to the set of haptic elements of the haptic feedback interface 112. The update may be done based on a change in position of one or more movable objects of the plurality of objects including the user 110. The second circuitry 210 may be configured to detect the change in real time or near-real time from the received sensor data.

At 442, one or more patterns in a plurality of user interactions on the haptic feedback interface 112 may be determined over a period of time based on a track of a usage pattern of the assistive device 102. The second circuitry 210 may be further configured to determine the one or more patterns in the plurality of user interactions on the haptic feedback interface 112 over a defined period, such as 3 months, based on a track of a usage pattern of the assistive device 102. The tracking of the usage pattern of the assistive device 102 may be executed by a learning engine in the memory 212 in each selected mode of the plurality of defined modes.

At 444, a shape of two or more haptic elements of the set of haptic elements may be adapted in the touch-discernible feedback (e.g., the touch-discernible feedback 328) based on the determined one or more patterns. The second circuitry 210 may be further configured to adapt the shape of two or more haptic elements of the set of haptic elements in the touch-discernible feedback (e.g., the touch-discernible feedback 328) based on the determined one or more patterns.

At 446, a different shape may be re-assigned to a sub-set of haptic elements that belongs to a common object-type based on a haptic input detected on at least one touch-discernible cue on the haptic feedback interface. In accordance with an embodiment, the haptic feedback interface 112 may receive an input on the same surface of the haptic feedback interface 112 where the touch-discernible feedback is generated. For example, the user 110 may press a protrusion (or a bulge) generated on the haptic feedback interface 112. Based on the amount of pressure exerted by the user 110 while touching the protrusion on the haptic feedback interface 112, the press may be considered a haptic input by the haptic feedback controller 220. In cases where the amount of pressure exerted by the user 110 on a particular point or a protrusion on the haptic feedback interface 112 is greater than a threshold pressure value, the press of the protrusion (or a bulge) may be considered a haptic input for that particular object of the 3D real-world area that is indicated by the pressed protrusion. A corresponding action related to the pressed protrusion may be executed by the haptic feedback controller 220 in association with the second circuitry 210. For example, an oval shape protrusion, which denotes a particular object-type, for example, a car, may be pressed. An audio feedback for that car may be generated. For example, "this is a car at a distance of 3 meters from you, be careful". Such voice-based feedback provided in combination to the generated touch-discernible feedback provide a synergistic and enhanced non-visual navigation assistance to the user 110 in real time or near-real time as the user 110 moves in the 3D real-world area. For example, in this case the input detected on the oval shape protrusion for car is augmented with voice feedback that provides additional information for that particular car. Further, in conventional devices, the input section to receive a haptic input is different from the output section (in a conventional haptic user interface) where the Braille output or other tactile forms of output are generated. Typically, input section to receive haptic input is a 6-keys or 8-keys Braille input. A separate section to receive input and provide output, may be considered a rudimentary form of HMI, where a generated haptic output may not be capable of receive a further feedback on a particular touch-discernible cue. In contrast, the same tactile surface area of haptic feedback interface 112 of the assistive device 102 acts both as the haptic input receiver and haptic output generator, where the user 110 may press a protrusion (or a bulge) generated on the haptic feedback interface 112 to provide the haptic input related to a specific object in the vicinity of the assistive device 102. Based on the amount of pressure exerted by the user 110 while touching the protrusion on the haptic feedback interface 112, the press may be considered a haptic input by the haptic feedback controller 220. Control passes to end 448.

In accordance with an exemplary aspect of the disclosure, a system for non-visually discerning a three dimensional (3D) real-world area surrounding a user, such as the user 110 is disclosed. The system may include the assistive device 102 (FIG. 1), which may comprise the haptic feedback interface 112 (FIG. 1) comprising the plurality of haptic elements 218 (FIG. 2). The assistive device 102 may further comprise the first circuitry 208, the second circuitry 210, and the haptic feedback generator 222 (FIG. 2). The first circuitry 208 may be configured to receive sensor data of a 3D real-world area within a first proximity range of the assistive device 102 from the plurality of sensors 104 that are communicatively coupled to the assistive device 102. The second circuitry 210 may be configured to determine a plurality of objects within the first proximity range based on the received sensor data. The second circuitry 210 may be further configured to receive an input to select a mode from a plurality of defined modes in the assistive device 102. Based on the selected mode, the second circuitry 210 may be configured to determine each of the plurality of objects as a relevant object or a non-relevant object to obtain a set of relevant objects and a set of non-relevant objects. The second circuitry 210 may be further configured to determine a scaling factor based on the first proximity range and the selected mode. The second circuitry 210 may be further configured to adjust sizes of the set of relevant objects to map the set of relevant objects with a set of haptic elements of the plurality of haptic elements 218 of the haptic feedback interface 112, wherein the sizes of the set of relevant objects are adjusted based on the scaling factor and a count of the set of the relevant objects. The assistive device 102 may further comprise the haptic feedback generator 222 configured to generate a touch-discernible feedback on the haptic feedback interface 112 based on the mapping of the set of relevant objects in the adjusted sizes with the set of haptic elements.

In accordance with an exemplary aspect of the disclosure, provided is a non-transitory computer-readable medium having stored thereon, computer executable instructions, which when executed by a processor in a computer, causes the computer to execute operations for non-visually discerning a three dimensional (3D) real-world area surrounding a user, such as the user 110, as disclosed herein. The present disclosure may be realized in hardware, or a combination of hardware and software. The present disclosure may be realized in a centralized fashion, in at least one computer system, or in a distributed fashion, where different elements may be spread across several interconnected computer systems or the special-purpose device. A computer system or other special-purpose apparatus adapted to carry out the methods described herein may be suited. The present disclosure may be realized in hardware that comprises a portion of an integrated circuit that also performs other functions.

The present disclosure may also be embedded in a computer program product, which comprises all the features that enable the implementation of the methods described herein, and which, when loaded in a special-purpose machine or computer system, is able to carry out these methods. Computer program, in the present context, means any expression, in any language, code or notation, of a set of instructions intended to cause a system with an information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made and equivalents may be substituted without deviation from the scope of the present disclosure. In addition, many modifications may be made to adapt a particular situation or material to the teachings of the present disclosure without deviation from its scope. Therefore, it is intended that the present disclosure not be limited to the particular embodiment disclosed, but that the present disclosure will include all embodiments falling within the scope of the appended claims.

What is claimed is:

1. An assistive device, comprising:
   a haptic feedback interface comprising a plurality of haptic elements;
   first circuitry configured to receive sensor data of a three-dimensional (3D) real-world area within a first proximity range of the assistive device from a plurality of different types of sensors that are communicatively coupled to the assistive device, wherein the sensor data is associated with the first proximity range of the assistive device;
   second circuitry configured to:
      determine a plurality of objects within the first proximity range based on the received sensor data;
      determine a scaling factor based on:
         the first proximity range that corresponds to a template map of the 3D real-world area, and
         a defined region of the haptic feedback interface;
      establish, based on the scaling factor, a mapping of the plurality of objects within the first proximity range to at least one haptic element of the plurality of haptic elements in the defined region of the haptic feedback interface;
      execute merge of two or more nearby relevant objects of the plurality of objects into one relevant object based on one or more of: the sensor data and the first proximity range of the assistive device;
      map the one relevant object to a corresponding haptic element of the plurality of haptic elements; and
      adjust sizes of the plurality of objects to map the plurality of objects with a set of haptic elements of the plurality of haptic elements, wherein the execution of the merge of the two or more nearby relevant objects is at a time of the adjustment of the sizes of the plurality of objects to map the plurality of objects with the set of haptic elements; and
   a haptic feedback generator configured to generate a touch-discernible feedback on the haptic feedback interface based on the adjustment of the sizes and the mapping of the plurality of objects.

2. The assistive device according to claim 1, wherein the second circuitry is further configured to:
   receive an input to select a mode from a plurality of defined modes in the assistive device, wherein the plurality of defined modes comprises a nature mode and a mobility mode; and
   based on the selected mode, determine each of the plurality of objects as one of a relevant object or a non-relevant object to obtain a set of relevant objects and a set of non-relevant objects, wherein the set of relevant objects includes the two or more nearby relevant objects.

3. The assistive device according to claim 2, wherein a resolution of the 3D real-world area within the first proximity range is higher in a case where the selected mode is the nature mode as compared to the mobility mode.

4. The assistive device according to claim 2, wherein the touch-discernible feedback comprises a plurality of differential touch-discernible cues to discern a 3D arrangement of each of the set of relevant objects with respect to a position of a user of the assistive device, wherein the touch-discernible feedback is independent of the set of non-relevant objects.

5. The assistive device according to claim 4, wherein the touch-discernible feedback corresponds to at least one of a differential pressure-based, a differential temperature-based, a differential electric pulse-based, a differential raised shape pattern-based touch-discernible feedback, or a combination of different touch-discernible feedback.

6. The assistive device according to claim 4, wherein the second circuitry is further configured to:
   identify an object-type of each of the plurality of objects, present within the first proximity range of the assistive device, based on the received sensor data; and
   determine the plurality of objects as one of the relevant object or the non-relevant object based on the identified object-type of each of the plurality of objects and the selected mode.

7. The assistive device according to claim 6, wherein the second circuitry is further configured to adjust the sizes of the set of relevant objects based on the object-type identified for each of the set of relevant objects of the plurality of objects present within the first proximity range.

8. The assistive device according to claim 7, wherein the haptic feedback generator is further configured to generate the plurality of differential touch-discernible cues in the touch-discernible feedback to discern different identified object-types of the set of relevant objects present within the first proximity range of the assistive device.

9. The assistive device according to claim 7, wherein the second circuitry is further configured to generate a three-dimensional (3D) digital model of the 3D real-world area within the first proximity range, based on the received sensor data and the selected mode on the assistive device, and wherein the generated 3D digital model is utilized for the mapping of the set of relevant objects within the first proximity range to the set of haptic elements.

10. The assistive device according to claim 1, wherein the second circuitry is further configured to:
   acquire a first template digital map of the 3D real-world area within the first proximity range of the assistive device from a server based on a position of the assistive device;
   transform the first template digital map to a first template haptic map; and
   update the first template haptic map with at least positional information of a set of relevant objects based on the sensor data of the 3D real-world area within the first proximity range of the assistive device, wherein the sensor data is received from the plurality of different types of sensors in real time or near-real time.

11. The assistive device according to claim 1, wherein the haptic feedback generator is further configured to dynamically update the touch-discernible feedback on the haptic feedback interface based on at least one of:
- a change in a position of one or more movable objects of a set of relevant objects of the plurality of objects while the assistive device is stationary,
- a change in a position the assistive device, or
- a change in a proximity range selection from the first proximity range to a second proximity range.

12. The assistive device according to claim 1, wherein the haptic feedback generator is further configured to dynamically update the touch-discernible feedback on the haptic feedback interface based on a change in a mode selection from a plurality of defined modes.

13. The assistive device according to claim 1, wherein the haptic feedback generator is further configured to output an audio feedback in combination with the touch-discernible feedback to enable non-visual discern of the 3D real-world area within the first proximity range of the assistive device by a user as the user moves from a first location to a second location in the 3D real-world area within the first proximity range in a selected mode.

14. The assistive device according to claim 1, further comprising a learning engine in a memory of the assistive device, wherein the second circuitry is further configured to determine one or more patterns in a plurality of user interactions on the haptic feedback interface over a period of time based on a track of a usage pattern of the assistive device by the learning engine in each selected mode of a plurality of defined modes.

15. The assistive device according to claim 14, wherein the second circuitry is further configured to adapt a shape of one or more haptic elements of the set of haptic elements in the touch-discernible feedback based on the determined one or more patterns.

16. The assistive device according to claim 1, wherein the haptic feedback interface is a haptic input/output (I/O) interface.

17. The assistive device according to claim 1, further comprising a haptic feedback controller configured to re-assign a different shape to a sub-set of haptic elements, that belongs to a common object-type, based on a haptic input on at least one touch-discernible cue on the haptic feedback interface.

18. The assistive device according to claim 1, wherein the second circuitry is further configured to adjust the sizes of the plurality of objects based on the scaling factor.

19. A method, comprising:
in an assistive device that comprises a haptic feedback interface:
receiving sensor data of a three-dimensional (3D) real-world area within a first proximity range of the assistive device from a plurality of different types of sensors that are communicatively coupled to the assistive device, wherein the sensor data is associated with the first proximity range of the assistive device;
determining a plurality of objects within the first proximity range based on the received sensor data;
determining a scaling factor based on;
the first proximity range that corresponds to a template map of the 3D real-world area, and
a defined region of the haptic feedback interface;
establishing, based on the scaling factor, a mapping of the plurality of objects within the first proximity range to at least one haptic element of a plurality of haptic elements in the defined region of the haptic feedback interface;
executing merging of two or more nearby relevant objects in the plurality of objects into one relevant object based on one or more of: the sensor data and the first proximity range of the assistive device;
mapping the one relevant object to a corresponding haptic element of the plurality of haptic elements;
adjusting sizes of the plurality of objects to map the plurality of objects with a set of haptic elements of the plurality of haptic elements, wherein the execution of the merging of the two or more nearby relevant objects is at a time of the adjustment of the sizes of the plurality of objects to map the plurality of objects with the set of haptic elements; and
generating a touch-discernible feedback on the haptic feedback interface based on the adjustment of the sizes and the mapping of the plurality of objects.

20. The method according to claim 19, further comprising:
receiving an input to select a mode from a plurality of defined modes in the assistive device; and
based on the selected mode, determining each of the plurality of objects as one of a relevant object or a non-relevant object to obtain a set of relevant objects and a set of non-relevant objects, wherein the set of relevant objects includes the two or more nearby relevant objects.

21. The method according to claim 20, wherein the plurality of defined modes comprises a nature mode and a mobility mode, and wherein a resolution of the 3D real-world area within the first proximity range is higher in a case where the selected mode is the nature mode as compared to the mobility mode.

\* \* \* \* \*